(12) United States Patent
Funada

(10) Patent No.: US 10,424,267 B2
(45) Date of Patent: Sep. 24, 2019

(54) ELECTRONIC DEVICE THAT CLASSIFIES IMAGE SIGNALS, DISPLAY DEVICE, AND DISPLAY CONTROL METHOD

(71) Applicant: CANON KABUSHIKI KAISHA, Tokyo (JP)

(72) Inventor: Masahiro Funada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/594,840

(22) Filed: May 15, 2017

(65) Prior Publication Data

US 2017/0345389 A1 Nov. 30, 2017

(30) Foreign Application Priority Data

May 26, 2016 (JP) ................................. 2016-104786

(51) Int. Cl.
*G09G 5/00* (2006.01)
*H04N 9/31* (2006.01)

(52) U.S. Cl.
CPC .......... *G09G 5/005* (2013.01); *H04N 9/3135* (2013.01); *H04N 9/3179* (2013.01); *H04N 9/3194* (2013.01); *G09G 2320/106* (2013.01); *G09G 2340/0442* (2013.01); *G09G 2370/20* (2013.01); *G09G 2370/22* (2013.01)

(58) Field of Classification Search
CPC ....................................................... H04N 5/46
USPC ......................... 348/383, 558, 630, 563–566
See application file for complete search history.

(56) References Cited

U.S. PATENT DOCUMENTS

| | | | | |
|---|---|---|---|---|
| 5,262,965 A | * | 11/1993 | Putnam | G06T 1/20 348/552 |
| 5,327,530 A | * | 7/1994 | Bae | G09G 1/167 345/501 |
| 5,760,840 A | * | 6/1998 | Tani | H04N 5/46 348/558 |
| 5,848,154 A | * | 12/1998 | Nishio | G06F 21/10 380/217 |
| 5,896,181 A | * | 4/1999 | Takamori | H04N 5/268 348/705 |
| 6,011,901 A | * | 1/2000 | Kirsten | G08B 13/19645 348/E7.086 |
| 6,900,844 B2 | * | 5/2005 | Itaki | G06F 3/1446 348/383 |

(Continued)

FOREIGN PATENT DOCUMENTS

JP 2011064857 A 3/2011

*Primary Examiner* — Paulos M Natnael
(74) *Attorney, Agent, or Firm* — Rossi, Kimms & McDowell LLP

(57) ABSTRACT

To facilitate selection of a display manner in a display device capable of displaying an image(s) based on a plurality of image signals, the display device according to the present invention includes: a video inputter including a plurality of input terminals configured to acquire a plurality of image signals including image data to be displayed by a display unit; a detector configured to detect characteristics of the image signals; a group determinator configured to classify the image signals into at least one group based on the characteristics detected by the detector; and an output control unit configured to output information indicating a display mode of the display unit associated with at least one group.

17 Claims, 19 Drawing Sheets

(56) References Cited

U.S. PATENT DOCUMENTS

| | | | | |
|---|---|---|---|---|
| 6,906,743 B1* | 6/2005 | Maurer | ................ | H04N 7/0112 348/180 |
| 7,570,305 B2* | 8/2009 | Joskin | ..................... | H04N 5/05 348/180 |
| 8,527,683 B2* | 9/2013 | Cauchy | ............... | G06F 13/4022 345/506 |
| 9,412,145 B2* | 8/2016 | Cauchy | ............... | G06F 13/4022 |
| 2001/0026326 A1* | 10/2001 | Itaki | ..................... | G06F 3/1446 348/383 |
| 2005/0212970 A1* | 9/2005 | Joskin | ................... | H04N 5/185 348/572 |
| 2007/0296654 A1* | 12/2007 | Huang | ..................... | G06F 3/14 345/87 |
| 2008/0259034 A1* | 10/2008 | Lee | ...................... | G06F 3/0317 345/166 |
| 2009/0094393 A1* | 4/2009 | Kobayashi | ............. | G06F 3/023 710/69 |
| 2013/0162608 A1* | 6/2013 | Kwon | ................... | G09G 5/003 345/204 |
| 2014/0253701 A1* | 9/2014 | Wexler | ..................... | A61F 9/08 348/62 |
| 2014/0267651 A1* | 9/2014 | Wexler | ................ | G09B 21/006 348/62 |

\* cited by examiner

FIG. 2

| DISPLAY MODE NAME | CONNECTION PATTERN | DISPLAY MODE IMAGE | DISPLAY MODE IDENTIFIER | CONNECTION SUPPORTED |
|---|---|---|---|---|
| SINGLE INPUT MODE | 201 | DVI-A | 1A | YES |
| | | DVI-B | 1B | YES |
| | | DVI-C | 1C | YES |
| | | DVI-D | 1D | YES |
| | | HDMI-X | 1X | YES |
| | | HDMI-Y | 1Y | YES |
| HORIZONTAL TWO-DIVISION INPUT MODE | 202 203 | DVI-A \| DVI-B | 2AB | NO |
| | | DVI-A \| DVI-C | 2AC | YES |
| | | DVI-A \| DVI-D | 2AD | NO |
| | | DVI-B \| DVI-C | 2BC | NO |
| | | DVI-B \| DVI-D | 2BD | YES |
| | | DVI-C \| DVI-D | 2CD | NO |
| | | HDMI-X \| HDMI-Y | 2XY | YES |
| HORIZONTAL FOUR-DIVISION INPUT MODE | 204 206 205 207 | DVI-A\|DVI-B\|DVI-C\|DVI-D | 4ST | YES |
| MATRIX FOUR-DIVISION INPUT MODE | 208 210 209 211 | DVI-A\|DVI-C / DVI-B\|DVI-D | 4CR | YES |

FIG. 9

| TERMINAL | RESOLUTION | FREQUENCY | GROUP | MOST RECOMMENDED DISPLAY MODE | | NEXT MOST RECOMMENDED DISPLAY MODE | | |
|---|---|---|---|---|---|---|---|---|
| | | | | IDENTIFIER | CONNECTION RESOLUTION | IDENTIFIER | CONNECTION RESOLUTION | DOWNGRADE REASON |
| DVI-A | 1920×1080 | 60.0001 Hz | 1 | 4CR | 3840×2160 | 0 | 0×0 | - |
| DVI-B | 1920×1080 | 60.0001 Hz | 1 | 4CR | 3840×2160 | 0 | 0×0 | - |
| DVI-C | 1920×1080 | 60.0001 Hz | 1 | 4CR | 3840×2160 | 0 | 0×0 | - |
| DVI-D | 1920×1080 | 60.0001 Hz | 1 | 4CR | 3840×2160 | 0 | 0×0 | - |
| HDMI-X | 1920×2160 | 59.9400 Hz | 2 | 2XY | 3840×2160 | 0 | 0×0 | - |
| HDMI-Y | 1920×2160 | 59.9400 Hz | 2 | 2XY | 3840×2160 | 0 | 0×0 | - |

FIG. 10

| DISPLAY MODE NAME | | | |
|---|---|---|---|
| SINGLE INPUT MODE | | | |
| ▷ DVI-A | A | 1920×1080 | 60.0001 Hz |
| DVI-B | B | 1920×1080 | 60.0001 Hz |
| DVI-C | C | 1920×1080 | 60.0001 Hz |
| DVI-D | D | 1920×1080 | 60.0001 Hz |
| HDMI-X | X | 1920×2160 | 59.9400 Hz |
| HDMI-Y | Y | 1920×2160 | 59.9400 Hz |
| HORIZONTAL TWO-DIVISION INPUT MODE | | | |
| DVI-AC | A\|C | | |
| DVI-BD | B\|D | | |
| HDMI-XY | X\|Y | 3840×2160 | 59.9400 Hz |
| HORIZONTAL FOUR-DIVISION INPUT MODE | | | |
| DVI-ABCD | A\|B\|C\|D | | |
| MATRIX FOUR-DIVISION INPUT MODE | | | |
| DVI-ABCD | A\|C / B\|D | 3840×2160 | 60.0001 Hz |

501 (HORIZONTAL TWO-DIVISION INPUT MODE section)
502 (MATRIX FOUR-DIVISION INPUT MODE section)

| UP | DOWN | NEXT | SET |

FIG. 11

| TERMINAL | RESOLUTION | FREQUENCY | GROUP | MOST RECOMMENDED DISPLAY MODE | | NEXT MOST RECOMMENDED DISPLAY MODE | | |
|---|---|---|---|---|---|---|---|---|
| | | | | IDENTIFIER | CONNECTION RESOLUTION | IDENTIFIER | CONNECTION RESOLUTION | DOWNGRADE REASON |
| DVI-A | 1920×1080 | 60.0001 Hz | 1 | 1A | 1920×1080 | 4CR | 3840×2160 | - |
| DVI-B | 1920×1080 | 60.0001 Hz | 1 | 1B | 1920×1080 | 4CR | 3840×2160 | - |
| DVI-C | 1920×1080 | 60.0001 Hz | 1 | 1C | 1920×1080 | 4CR | 3840×2160 | - |
| DVI-D | 1920×1080 | 60.0050 Hz | 2 | 1D | 1920×1080 | 4CR | 3840×2160 | - |
| HDMI-X | 1920×2160 | 59.9400 Hz | 3 | 2XY | 3840×2160 | 0 | 0×0 | - |
| HDMI-Y | 1920×2160 | 59.9400 Hz | 3 | 2XY | 3840×2160 | 0 | 0×0 | - |

FIG. 13

| TERMINAL | RESOLUTION | FREQUENCY | GROUP | MOST RECOMMENDED DISPLAY MODE | | NEXT MOST RECOMMENDED DISPLAY MODE | | |
|---|---|---|---|---|---|---|---|---|
| | | | | IDENTIFIER | CONNECTION RESOLUTION | IDENTIFIER | CONNECTION RESOLUTION | DOWNGRADE REASON |
| DVI-A | 1920×1200 | 59.9502 Hz | 1 | 1A | 1920×1200 | 2AB | 3840×1200 | NON-SYNCHRONOUS |
| DVI-B | 1920×1200 | 59.9502 Hz | 1 | 1B | 1920×1200 | 2AB | 3840×1200 | NON-SYNCHRONOUS |
| DVI-C | 1280×1600 | 59.9719 Hz | 2 | 1C | 1280×1600 | 2CD | 2560×1600 | NON-SYNCHRONOUS |
| DVI-D | 1280×1600 | 59.9719 Hz | 2 | 1D | 1280×1600 | 2CD | 2560×1600 | NON-SYNCHRONOUS |
| HDMI-X | 1920×2160 | 59.9400 Hz | 3 | 2XY | 3840×2160 | 0 | 0×0 | - |
| HDMI-Y | 1920×2160 | 59.9400 Hz | 3 | 2XY | 3840×2160 | 0 | 0×0 | - |

FIG. 14

| | | | | |
|---|---|---|---|---|
| DISPLAY MODE NAME | | | | |
| SINGLE INPUT MODE | | | | |
| ▷ DVI-A | A | 1920 × 1200 | 59.9502 Hz | ~701 |
| DVI-B | B | 1920 × 1200 | 59.9502 Hz | ~702 |
| DVI-C | C | 1280 × 1600 | 59.9719 Hz | ~703 |
| DVI-D | D | 1280 × 1600 | 59.9719 Hz | ~704 |
| HDMI-X | X | 1920 × 2160 | 59.9400 Hz | ~705 |
| HDMI-Y | Y | 1920 × 2160 | 59.9400 Hz | ~706 |
| HORIZONTAL TWO-DIVISION INPUT MODE | | | | |
| DVI-AC | A C | | NON-SYNCHRONOUS | ~707 |
| DVI-BD | B D | | NON-SYNCHRONOUS | ~708 |
| HDMI-XY | X Y | 3840 × 2160 | 59.9400 Hz | ~709 |
| HORIZONTAL FOUR-DIVISION INPUT MODE | | | | |
| DVI-ABCD | A B C D | | | |
| MATRIX FOUR-DIVISION INPUT MODE | | | | |
| DVI-ABCD | A C / B D | | | |

| UP | DOWN | NEXT | SET |
|---|---|---|---|

FIG. 15

| TERMINAL | RESOLUTION | FREQUENCY | GROUP | MOST RECOMMENDED DISPLAY MODE | | NEXT MOST RECOMMENDED DISPLAY MODE | | DOWNGRADE REASON |
|---|---|---|---|---|---|---|---|---|
| | | | | IDENTIFIER | CONNECTION RESOLUTION | IDENTIFIER | CONNECTION RESOLUTION | |
| DVI-A | 1920×1080 | 60.0000 Hz | 1 | 1A | 1920×1080 | 0 | 0×0 | - |
| DVI-B | 1920×1080 | 60.0001 Hz | 2 | 1B | 1920×1080 | 0 | 0×0 | - |
| DVI-C | 1920×1080 | 60.0002 Hz | 3 | 1C | 1920×1080 | 0 | 0×0 | - |
| DVI-D | 1920×1080 | 60.0003 Hz | 4 | 1D | 1920×1080 | 0 | 0×0 | - |
| HDMI-X | 0×0 | - | - | 0 | 0×0 | 0 | 0×0 | - |
| HDMI-Y | 0×0 | - | - | 0 | 0×0 | 0 | 0×0 | - |

ELECTRONIC DEVICE THAT CLASSIFIES IMAGE SIGNALS, DISPLAY DEVICE, AND DISPLAY CONTROL METHOD

BACKGROUND OF THE INVENTION

Field of the Invention

The present invention relates to an electronic device and a display device each configured to receive input of image signals, and a display control method for the electronic device and the display device.

Description of the Related Art

For displaying an image on a display device having a large screen, there has been known a method of inputting multiple image signals respectively for multiple regions included in the screen. Japanese Patent Application Laid-Open No. 2011-64857 discloses a display device including four input terminals and configured to, when four image signals inputted to the four input terminals contain pieces of image data with an equal resolution, display four images included in the four image signals connected at the center of the screen.

SUMMARY OF THE INVENTION

An electronic device according to the present invention includes: an image inputter including multiple input terminals for acquiring multiple image signals each including a piece of image data to be displayed by a display unit; a detector configured to detect characteristics of the image signals; a classification unit configured to classify the image signals into at least one group based on the characteristics detected by the detector; and an outputter configured to output information indicating a display mode of the display unit associated with the at least one group.

A display device according to the present invention includes: a display unit configured to display an image; an image inputter including a plurality of input terminals configured to acquire a plurality of image signals each including a piece of image data displayed by the display unit; a detector configured to detect characteristics of the image signals; a classification unit configured to classify the image signals into at least one group based on the characteristics detected by the detector; and an outputter configured to output, to the display unit, information indicating a display mode of the display unit associated with the at least one group.

A display control method according to the present invention includes: acquiring a plurality of image signals each including a piece of image data to be displayed by a display unit; detecting characteristics of the image signals; classifying the image signals into at least one group based on the detected characteristics; and outputting, to the display unit, information indicating a display mode of the display unit associated with the at least one group.

Further features of the present invention will become apparent from the following description of exemplary embodiments with reference to the attached drawings.

BRIEF DESCRIPTION OF THE DRAWINGS

FIG. 2 is a diagram illustrating an exemplary display mode.

FIG. 9 is a diagram illustrating a terminal property table in Example 1.

FIG. 10 is a diagram illustrating a display mode selection menu in Example 1.

FIG. 11 is a diagram illustrating a terminal property table in Example 2.

FIG. 13 is a diagram illustrating a terminal property table in Example 3.

FIG. 14 is a diagram illustrating a display mode selection menu in Example 3.

FIG. 15 is a diagram illustrating a terminal property table in Example 4.

DESCRIPTION OF THE EMBODIMENTS

The conventional display device disclosed in Japanese Patent Application Laid-Open No. 2011-64857 has the following problem. Specifically, even though a user inputs image signals, the images of which are not desired to be connected on the display, the display device automatically displays the connected images of the image signals if the images have the same resolution. Thus, after the images are displayed in an undesired manner, the user needs to perform an operation to change various settings to achieve a desired display manner, which requires a time to display the images in the desired manner.

The present invention is intended to solve the above-described problem and facilitate selection of a display manner of image data based on multiple image signals.

First Embodiment

Preferred embodiments of the present invention will be described in detail below with reference to the accompanying drawings. The present invention is applicable to an electronic device such as a liquid crystal projector device, a digital light processing (DLP) projector, or a liquid crystal display device.

Configuration of Display Device 1

Figure 1:
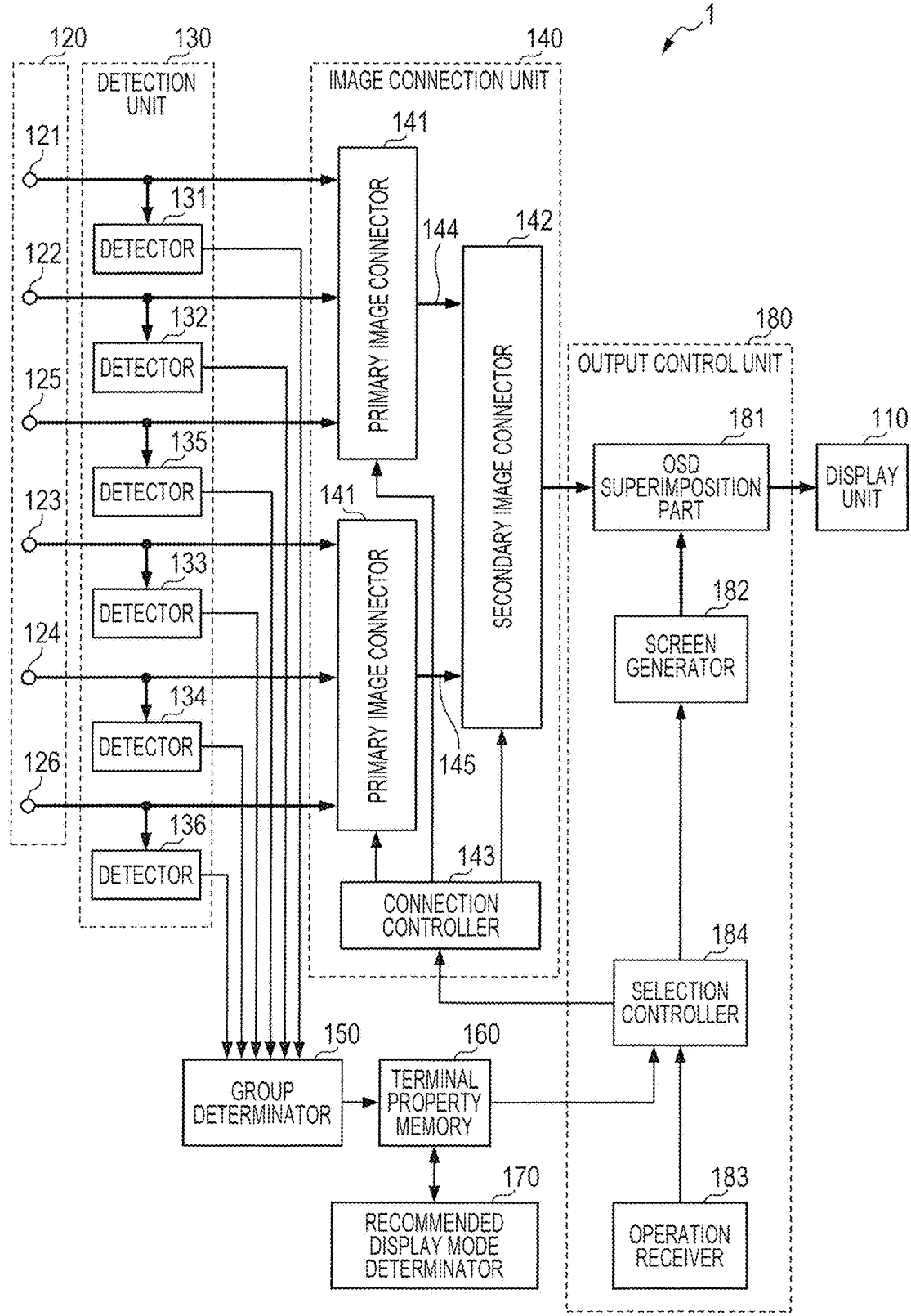
FIG. 1 is a configuration diagram of a display device 1 according to a first embodiment.

FIG. 1 is a configuration diagram of a display device 1 according to a first embodiment. The display device 1 is a display including a display unit 110, a video input unit (video inputter) 120, a detector (detection unit) 130, an image connection unit 140, a group determination unit (a group determinator) 150, a terminal property memory 160, a recommended display mode determination unit (a recommended display mode determinator) 170, and an output control unit 180. The detector 130, the image connection unit 140, the group determination unit 150, the recommended display mode determination unit 170, and the output control unit 180 are controlled by, for example, a central processing unit (CPU) configured to execute a computer program stored in a storage medium such as a read only memory (ROM) or a hard disk.

The display unit 110 is a display unit configured to output image data included in an input image signal, and is, for example, a liquid crystal display. In the present embodiment, the display unit 110 has a horizontal resolution of 3840 pixels and a vertical resolution of 2160 pixels.

The video input unit 120 is an image inputter including multiple input terminals through which multiple image signals including image data to be displayed by the display unit 110 are inputted. The video input unit 120 includes multiple input terminals for acquiring multiple image signals from, for example, a computer. The video input unit 120 includes six terminals DVI-A 121, DVI-B 122, DVI-C 123, DVI-D 124, HDMI-X 125, and HDMI-Y 126 (HDMI is a registered trademark).

The detector 130 is a detector configured to detect characteristics of multiple image signals each inputted to the video input unit 120. The detector 130 detects, for example, the vertical synchronization signal frequency (hereinafter referred to as the vertical synchronization frequency) of the image signal inputted to each input terminal included in the video input unit 120. The detector 130 may detect the horizontal synchronization signal frequency (hereinafter referred to as the horizontal synchronization frequency) of an input image signal and the resolution of image data included in the image signal.

The detector 130 includes detectors 131, 132, 133, 134, 135, and 136 corresponding to the respective six input terminals. The detectors 131 to 136 detect the vertical synchronization frequencies at an accuracy enough to perform determination of whether vertical synchronization signals from the respective input terminals are synchronized with each other. Similarly, the detectors 131 to 136 may detect the horizontal synchronization frequencies at an accuracy enough to perform determination of whether horizontal synchronization signals from the respective input terminals are synchronized with each other. A synchronized state includes not only a state in which change timings of the vertical synchronization signals or horizontal synchronization signals from the respective input terminals match with each other, but also a state in which a delay amount is constant between multiple vertical synchronization signals or between multiple horizontal synchronization signals.

The image connection unit 140 generates one piece of connected image data by disposing multiple pieces of image data included in the image signals inputted through the input terminals, at positions specified by the output control unit 180, and connecting the pieces of image data. The image connection unit 140 includes two primary image connectors 141, a secondary image connector 142, and a connection controller 143. The image connection unit 140 generates the connected image data by connecting the pieces of image data in a manner suited to a display mode of the display unit 110 selected by a user.

The primary image connectors 141 each connect, based on image signals through three input terminals connected with an image signal source, pieces of image data in a display mode specified by the connection controller 143 among three kinds of display modes described below. Then, the primary image connectors 141 output the connected synthesis images data to a path 144 and a path 145.

Single-signal selection mode: only image data included in one selected image signal is outputted.

Two-signal horizontal connection mode: pieces of image data included in two selected image signals are connected in the horizontal direction and outputted.

Two-signal vertical connection mode: pieces of image data included in two selected image signals are connected in the vertical direction and outputted.

The above-described display modes are merely exemplary. The primary image connectors 141 may connect images in another display mode.

Based on a display mode specified by the connection controller 143, the secondary image connector 142 processes the pieces of synthesis image data inputted through the two paths 144 and 145 connected with the secondary image connector 142, in any one of a one-signal selection mode and a two-signal connection mode. In the one-signal selection mode, any one of the pieces of synthesis image data is selected and outputted. In the two-signal connection mode, the two pieces of synthesis image data are connected and outputted.

The connection controller 143 controls the two primary image connectors 141 and the secondary image connector 142 in response to a display mode setting instruction from the output control unit 180.

FIG. 2 is a diagram illustrating an exemplary display mode. The display device 1 has display modes of a single input mode, a horizontal two-division input mode, a horizontal four-division input mode, and a matrix four-division input mode. In the single input mode, the display device 1 displays an image 201 inputted to a single input terminal among all input terminals. In the horizontal two-division input mode, the display device 1 displays a left image 202 and a right image 203 in a connected manner. In the horizontal two-division input mode, the two images from two input terminals are displayed in three combinations below.

The left image 202 for DVI-A 121, and the right image 203 for DVI-C 123

The left image 202 for DVI-B 122, and the right image 203 for DVI-D 124

The left image 202 for HDMI-X 125, and the right image 203 for HDMI-Y 126

The display device 1 according to the present embodiment cannot display image data in any combination other than the above-described combinations.

In the horizontal four-division input mode, the display device 1 displays, in a connected manner, an image 204, an image 205, an image 206, and an image 207 in this order from left to right in the horizontal direction. The combination of the corresponding input terminals is only a combination of the terminals DVI-A 121, DVI-B 122, DVI-C 123, and DVI-D 124, respectively for the images 204 to 207.

In the matrix four-division input mode, the display device 1 displays images in four regions of upper-left, lower-left, upper-right, and lower-right regions. In the matrix four-division input mode, the display unit 110 displays an image 208 in the upper-left region, an image 209 in the lower-left region, an image 210 in the upper-right region, and an image 211 in the lower-right region in a connected manner in the horizontal direction and the vertical direction. The combination of the corresponding input terminals is only a combination based on four image signals inputted through the terminals DVI-A 121, DVI-B 122, DVI-C 123, and DVI-D 124.

The group determination unit 150 is a classification unit configured to classify multiple image signals detected by the detector 130 into at least one group by determining a group to which each image signal belongs based on a characteristic of the image signal. The group determination unit 150 classifies, into the same group, image signals in which the detector 130 detects the same characteristic. For example, the group determination unit 150 classifies multiple input terminals into at least one group by sorting the input terminals into one or more groups such that input terminals used to receive image signals in which the detector 130 detects the same vertical synchronization frequency are classified into one group.

The group determination unit 150 may achieve an improved accuracy of the classification by sorting, into one group, image signals in which the detector 130 detects both the same vertical synchronization frequency and the same horizontal synchronization frequency, instead of using only the vertical synchronization frequency. Alternatively, the group determination unit 150 may achieve an improved accuracy of the classification by sorting, into one group, image signals in which the detector 130 detects both the same vertical synchronization frequency and the same resolution.

The group determination unit 150 allocates a belonged group identifier to each group and associates the belonged group identifier with an input terminal. Then, the group determination unit 150 outputs, to the terminal property memory 160, the resolution, the vertical synchronization frequency, and the belonged group identifier of image data included in an image signal inputted to the input terminal. Image signals outputted in a divided manner from an identical signal source are in a synchronized state. Thus, the group determination unit 150 can classify input terminals into at least one group based on the vertical synchronization frequency, thereby classifying, into one group, input terminals through which image signals outputted from an identical signal source are inputted. When classifying input terminals into at least one group based on the horizontal synchronization frequency, the group determination unit 150 may output the horizontal synchronization frequency included in each image signal to the terminal property memory 160.

The terminal property memory 160 is a storage unit configured to store therein, in association with an input terminal, a characteristic of an image signal inputted to the input terminal, identification information of a group to which the input terminal belongs, and a display mode type associated with this group. Specifically, the terminal property memory 160 stores therein the input resolution, the vertical synchronization frequency, the horizontal synchronization frequency, and the belonged group identifier in association with an input terminal.

The terminal property memory 160 stores therein, as the display mode type in association with an input terminal, most recommended display mode information indicating a display mode recommended to display image data based on an image signal inputted to the input terminal, and the resolution of display in a most recommended display mode. The terminal property memory 160 may further store, as the display mode type, next most recommended display mode information indicating a display mode recommended next, and the resolution of display in a next most recommended display mode.

The recommended display mode determination unit 170 is a determinator configured to determine a display mode type available for each of at least one group based on the number of image signals included in the group. The recommended display mode determination unit 170 may function as a determinator configured to determine any available display mode type based on the type of an input terminal through which an image signal included in each of at least one group is inputted. The recommended display mode determination unit 170 may determine any available display mode type based on both of the number of image signals and the type of an input terminal through which the image signals are inputted. The recommended display mode determination unit 170 allocates, to a group for which display modes are available, the most recommended display mode, which is recommended most to the user, or the next most recommended display mode, which is recommended next to the user.

When the number of image signals included in a group is equal to a predetermined number, the recommended display mode determination unit 170 determines the most recommended display mode to be a display mode corresponding to the group. When the number of image signals included in the group is smaller than the predetermined number, the recommended display mode determination unit 170 determines the next most recommended display mode to be a display mode corresponding to the group. For example, when four image signals having the same characteristic are inputted to four input terminals used in combination, the recommended display mode determination unit 170 determines the most recommended display mode to be a four-division input mode as a display mode for a group to which the four input terminals belong. When three image signals having the same characteristic are inputted to four input terminals used in combination, the recommended display mode determination unit 170 determines the next most recommended display mode to be a four-division input mode.

The recommended display mode determination unit 170 may determine an available display mode further based on a characteristic of image data included in an input image signal. The recommended display mode determination unit 170 reads parameters such as the horizontal resolution, the vertical resolution, the vertical synchronization frequency, the horizontal synchronization frequency, and the belonged group identifier of each input terminal stored in the terminal property memory 160, and determines the most recommended display mode of the input terminal through a most recommended display mode determination process.

More preferably, the recommended display mode determination unit 170 executes determination of the next most recommended display mode, calculation of a resolution at connection, and specification of a downgrade reason in parallel. The downgrade reason is a reason why the display mode of a group is not the most recommended display mode but the next most recommended display mode, and is, for example, such that the group does not include the predetermined number of image signals. The recommended display mode determination unit 170 stores the most recommended display mode information indicating the most recommended display mode thus determined and the calculated resolution at connection in the terminal property memory 160.

The present embodiment assumes display mode types illustrated in FIG. 2 for simplicity of description, but is not limited to the example illustrated in FIG. 2. The recommended display mode determination unit 170 may handle a larger number of display mode types to be searched, or may be limited to any display mode supported by the image connection unit 140.

The output control unit 180 controls what screen is to be displayed by the display unit 110. For example, the output control unit 180 functions as an outputter configured to output, to the display unit 110, information indicating any display mode associated with at least one group. Specifically, the output control unit 180 controls the display unit 110 to display a menu that allows the user to select a display mode. In addition, the output control unit 180 selects, based on a user operation, one display mode from among a plurality of display modes included in a displayed menu.

The output control unit 180 notifies the image connection unit 140 of a display mode selected by the user. The output control unit 180 acquires, from the image connection unit 140, a plurality of image signals included in a group selected by the user from among at least one group based on a manner in which image data is connected in a display mode associated with the selected group, synthesizes the acquired image signals, and outputs the synthesized image signals to the display unit 110. Specifically, the output control unit 180 outputs image data based on the image signals in a layout determined based on the number of the image signals included in the selected group and the resolutions of the image signals.

The output control unit 180 includes an OSD superimposition part 181, a screen generator 182, an operation receiver 183, and a selection controller 184.

The OSD superimposition part 181 superimposes a display mode selection menu screen generated by the screen generator 182 on image data outputted from the image connection unit 140, and outputs the superimposed screen to the display unit 110.

The screen generator 182 stores various parts to be included in various menus for receiving an operation by the user, and generates screen data on a display mode selection menu that allows the user to select a display mode. The screen generator 182 outputs the generated screen data to the display unit 110 through the OSD superimposition part 181. The screen generator 182 outputs screen data for receiving an operation to select one group from among at least one group, for example, in a different manner in accordance with a display mode type. The screen generator 182 also outputs screen data including an operation icon image for selecting at least one group, display mode type of which satisfies a predetermined condition.

Figure 3:
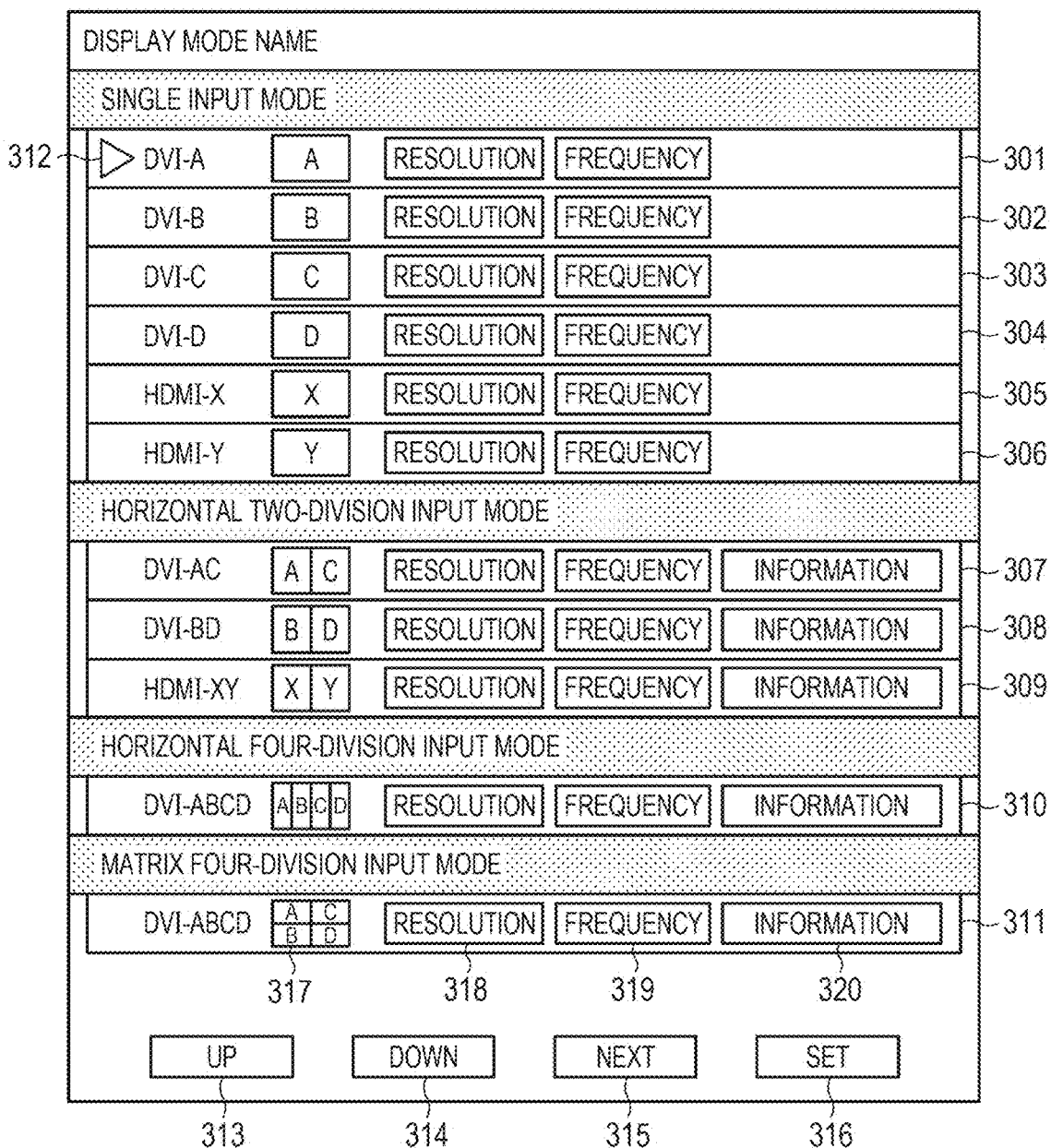
FIG. 3 is a diagram illustrating an exemplary display mode selection menu screen.

FIG. 3 is a diagram illustrating an exemplary display mode selection menu screen for selecting a display mode. The display mode selection menu screen presents a plurality of candidate display modes corresponding to the number of input terminals included in each group. The display mode selection menu screen includes operation icon images such as display mode options 301 to 311, a selection cursor 312, an up button 313, a down button 314, a NEXT button 315, and a set button 316.

Single input mode DVI-A 301 in FIG. 3 is an option for display mode identifier 1A in FIG. 2. Single input mode DVI-B 302 is an option for display mode identifier 1B in FIG. 2. Single input mode DVI-C 303 is an option for display mode identifier 1C in FIG. 2. Single input mode DVI-D 304 is an option for display mode identifier 1D in FIG. 2. Single input mode HDMI-X 305 is an option for display mode identifier 1X in FIG. 2. Single input mode HDMI-Y 306 is an option for display mode identifier 1Y in FIG. 2.

Horizontal two-division input mode DVI-AC 307 is an option for display mode identifier 2AC in FIG. 2. Horizontal two-division input mode DVI-BD 308 is an option for display mode identifier 2BD in FIG. 2. Horizontal two-division input mode HDMI-XY 309 is an option for display mode identifier 2XY in FIG. 2. Horizontal four-division input mode DVI-ABCD 310 is an option for display mode identifier 4ST in FIG. 2. Matrix four-division input mode DVI-ABCD 311 is an option for display mode identifier 4CR in FIG. 2.

The following describes parts included in the options illustrated in FIG. 3 with reference to the matrix four-division input mode DVI-ABCD 311 as an example. The matrix four-division input mode DVI-ABCD 311 includes a connected image icon 317, a resolution information region 318, a frequency information region 319, and an information display region 320.

The connected image icon 317 illustrates a connected image of image signals inputted to input terminals corresponding to a display mode. The screen generator 182 displays, by referring to the terminal property memory 160, the connected image icon 317 corresponding to an input terminal in the most recommended display mode in a color different from the color of the connected image icon 317 corresponding to an input terminal not in the most recommended display mode. When any of display modes in which a plurality of pieces of image data included in image signals input from a plurality of input terminals are connected with each other is the next most recommended display mode, the screen generator 182 may display any missing input terminal in an unchanged color to allow the user to identify the missing input terminal.

The resolution information region 318 is a region for displaying the resolution of connected image data obtained by connecting a plurality of pieces of image data, when the display mode of a group is the most recommended display mode or the next most recommended display mode. The frequency information region 319 is a region for displaying the frequency of the connected image data, when the display mode of the group is the most recommended display mode or the next most recommended display mode.

The screen generator 182 may generate a screen for displaying a resolution and a frequency when the single input mode in six rows 301 to 306 is not the most recommended display mode or the next most recommended display mode. In this case, the screen generator 182 preferably allows the user to recognize that the single input mode is not the most recommended display mode or the next most recommended display mode, by displaying the connected image icon 317 in a manner different from a manner in which the connected image icon 317 is displayed in the most recommended display mode or the next most recommended display mode.

The information display region 320 is a region for displaying, when there is a problem with an image signal inputted to an input terminal, warning information indicating the content of the problem. For example, when the number of image signals included in the group is smaller than the predetermined number, the screen generator 182 generates screen data including warning information indicating an input terminal from which an image signal is missing. When part of the image signals included in the group has an irrelevant frequency or resolution, the screen generator 182 generates screen data including warning information indicating an input terminal from which an image signal has an irrelevant frequency or resolution.

When the next most recommended display mode is any one of 2AB, 2AD, and 2CD, which are non-supported combinations of two input terminals, the screen generator 182 generates a screen including warning information indicating the non-supported combination in each of rows of two-division input modes DVI-AC 307 and DVI-BD 308. Since such a situation in which there is a problem with part of image signals does not occur in the single input mode in six rows 301 to 306, the screen generator 182 does not need to display the information display region 320.

While displaying the display mode selection menu, the screen generator 182 moves the selection cursor 312 to a row above when the user presses the up button 313, moves the selection cursor 312 to a row below when the user presses the down button 314, or moves the selection cursor 312 to a row of the next most recommended display mode when the user presses the NEXT button 315. When the user presses the set button 316, the screen generator 182 changes a display manner of a row in which the selection cursor 312 is displayed so as to indicate that the content of the row is applied.

The operation receiver 183 receives an operation performed by the user to select any one of the up button 313, the down button 314, the NEXT button 315, and the set button 316 included in the display mode selection menu screen. The operation receiver 183 notifies the selection controller 184 of information indicating the content of the received operation. The above-described buttons included in the selection menu screen are merely exemplary, and may include any other operation button.

The selection controller 184 reads a parameter associated with each input terminal from the terminal property memory 160, and outputs, based on the contents of the most recommended display mode and the next most recommended display mode determined by the recommended display mode determination unit 170, information corresponding to a parameter to be displayed on the display unit 110 to the screen generator 182. When having received, from the operation receiver 183, a notification of a display mode selected by the user, the selection controller 184 notifies the image connection unit 140 of information for specifying the selected display mode.

[Most Recommended Display Mode Determination Process]

The following describes the most recommended display mode determination process executed at the recommended display mode determination unit 170.

FIGS. 4 to 8 are each a diagram illustrating the most recommended display mode determination process executed by the recommended display mode determination unit 170. In the present embodiment, it is assumed for simplicity of description that DVI and HDMI are not included in one group, but DVI and HDMI may be included in one group.

Figure 4:
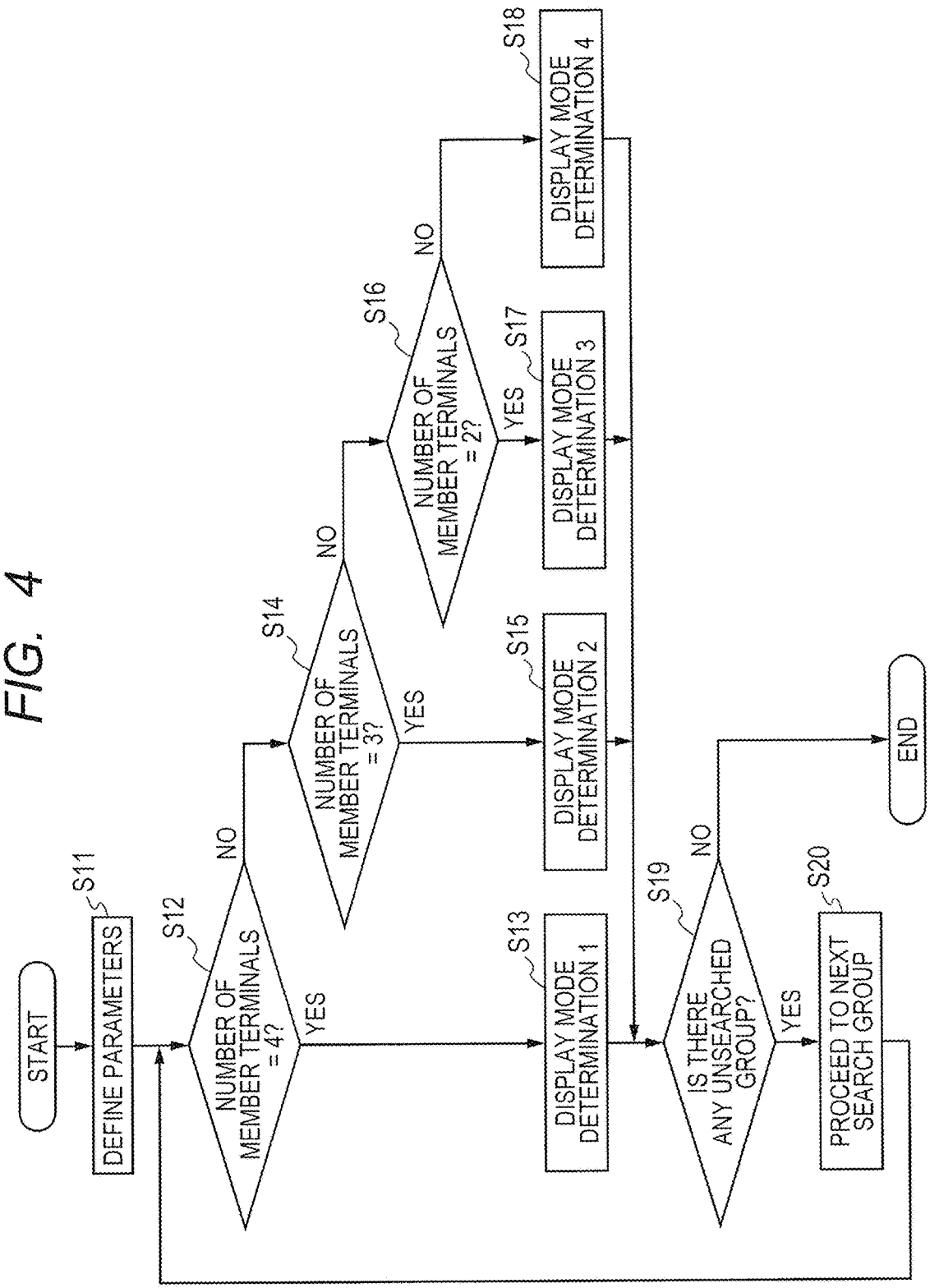
FIG. 4 illustrates a most recommended display mode determination process followed by a recommended display mode determination unit 170.

First, the overall flow of the most recommended display mode determination process will be described with reference to FIG. 4.

At step S11, the recommended display mode determination unit 170 defines parameters to be stored in the terminal property memory 160. The parameters include a most/next most recommended display mode RDM variable, a horizontal resolution Httl variable, a vertical resolution Vttl variable, and a downgrade reason RSN.

The most/next most recommended display mode RDM variable is an array having two elements. Among the two elements, RDM[0] as an element with index 0 stores a display mode identifier corresponding to the most recommended display mode, and RDM[1] as an element with index 1 stores a display mode identifier corresponding to the next most recommended display mode.

The horizontal resolution Httl variable is an array having two elements. Httl[0] as an element with index 0 stores a horizontal resolution after connection in the most recommended display mode, and Httl[1] as an element with index 1 stores a horizontal resolution after connection in the next most recommended display mode.

The vertical resolution Vttl variable is an array having two elements. Vttl[0] as an element with index 0 stores a vertical resolution after connection in the most recommended display mode, and Vttl[1] as an element with index 1 stores a vertical resolution after connection in the next most recommended display mode.

The downgrade reason RSN stores a downgrade reason when there is the next most recommended display mode.

Subsequently, at steps S12 to S18, the recommended display mode determination unit 170 searches for the most recommended display mode or the next most recommended display mode sequentially for each group corresponding to a belonged group identifier. Then, if there is no unsearched group (NO at S19), the recommended display mode determination unit 170 ends the search. If there is any unsearched group (YES at S19), the recommended display mode determination unit 170 proceeds to a next search group at step S20 and continues the search operation from step S12.

In the following description, a search group refers to a group as a target of the search for the most recommended display mode or the next most recommended display mode. The recommended display mode determination unit 170 executes processing of one search group at steps S12 to S18 to determine whether there are the most recommended display mode and the next most recommended display mode for all input terminals belonging to the search group, and updates the terminal property memory 160 based on a result of the determination.

At step S12, the recommended display mode determination unit 170 determines whether the input terminals belonging to the search group are the four input terminals DVI-A 121, DVI-B 122, DVI-C 123, and DVI-D 124. The recommended display mode determination unit 170 executes display mode determination process 1 (determination process illustrated in FIG. 5) at step S13 if the determination at step S12 gives YES, or executes step S14 if the determination gives NO.

At step S14, the recommended display mode determination unit 170 determines whether the input terminals belonging to the search group are three input terminals among the four input terminals DVI-A 121, DVI-B 122, DVI-C 123, and DVI-D 124. The recommended display mode determination unit 170 executes display mode determination process 2 (determination process illustrated in FIG. 6) at step S15 if the determination at step S14 gives YES, or executes step S16 if the determination gives NO.

At step S16, the recommended display mode determination unit 170 determines whether the input terminals belonging to the search group are two input terminals. The recommended display mode determination unit 170 executes display mode determination process 3 (determination process illustrated in FIG. 7) at step S17 if the determination at step S16 gives YES, or executes display mode determination process 4 (determination process illustrated in FIG. 8) at step S18 if the determination gives NO.

The following describes display mode determination processes 1 to 4 with reference to FIGS. 5 to 8.

Figure 5:
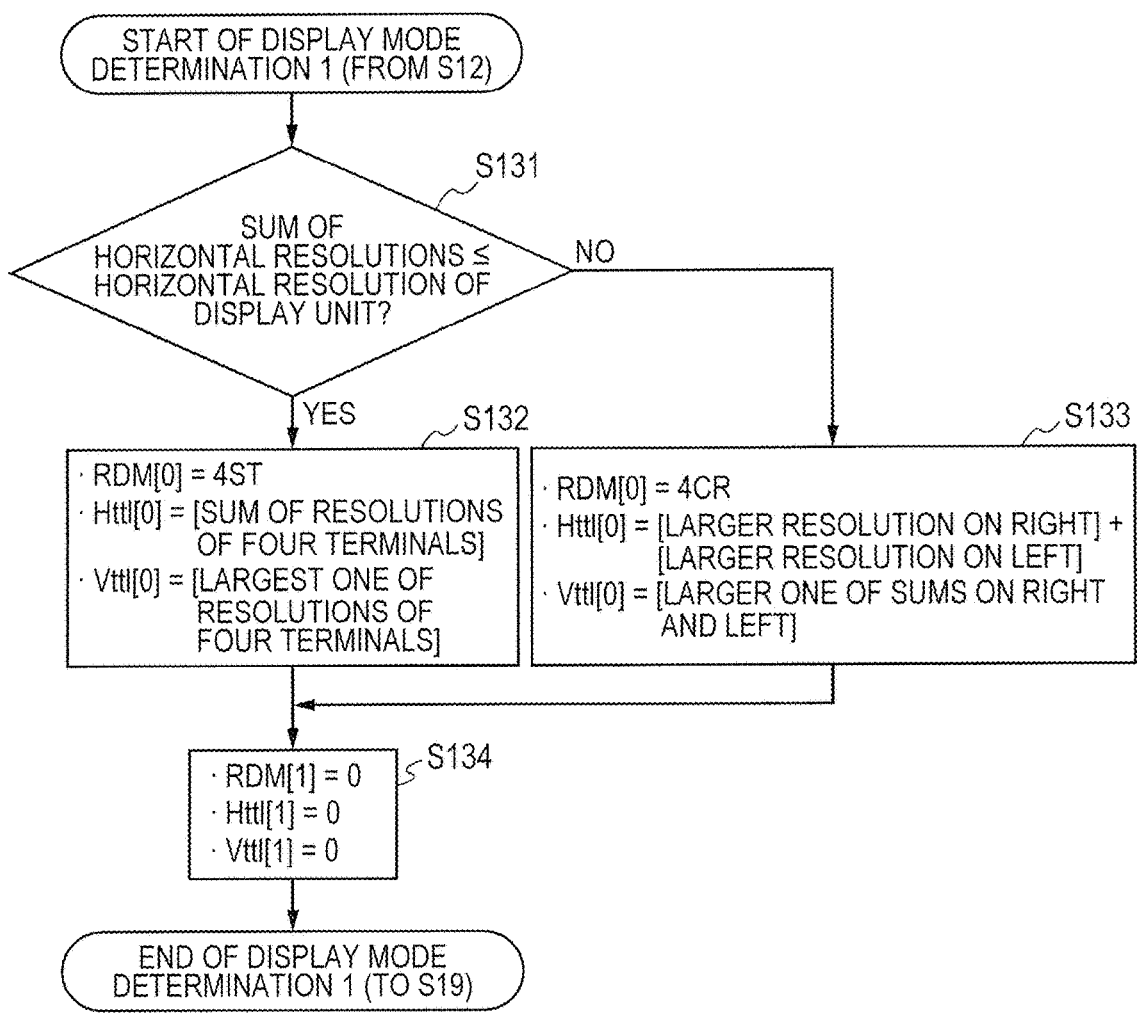
FIG. 5 illustrates display mode determination process 1 followed by the recommended display mode determination unit 170.

FIG. 5 is a diagram illustrating display mode determination process 1 in detail. At step S131, the recommended display mode determination unit 170 determines whether the sum of the horizontal resolutions of the four member terminals is smaller than the horizontal resolution of the display unit 110. The recommended display mode determination unit 170 executes step S132 if the determination at step S131 gives YES, or executes step S133 if the determination gives NO.

At step S132, the recommended display mode determination unit 170 determines that the most recommended display mode is the horizontal four-division input mode, and stores, in RDM[0], display mode identifier 4ST corresponding to the horizontal four-division input mode. The recommended display mode determination unit 170 stores, in Httl[0], the sum of the horizontal resolutions of DVI-A 121 to DVI-D 124, and stores, in Vttl[0], the largest one of the vertical resolutions of DVI-A 121 to DVI-D 124.

At step S133, the recommended display mode determination unit 170 determines that the most recommended display mode is the matrix four-division input mode, and stores, in RDM[0], display mode identifier 4CR corresponding to the matrix four-division input mode. The recommended display mode determination unit 170 stores, in Httl[0], the sum of the larger one of the horizontal resolutions of DVI-A 121 and DVI-B 122 and the larger one of the horizontal resolutions of DVI-C 123 and DVI-D 124. The recommended display mode determination unit 170 stores, in Vttl[0], the larger one of the sum of the vertical resolutions of DVI-A 121 and DVI-B 122 and the sum of the vertical resolutions of DVI-C 123 and DVI-D 124.

At step S134, the recommended display mode determination unit 170 determines that there is no next most recommended display mode, and stores 0 in RDM[1], Httl[1], and Vttl[1].

Figure 6:
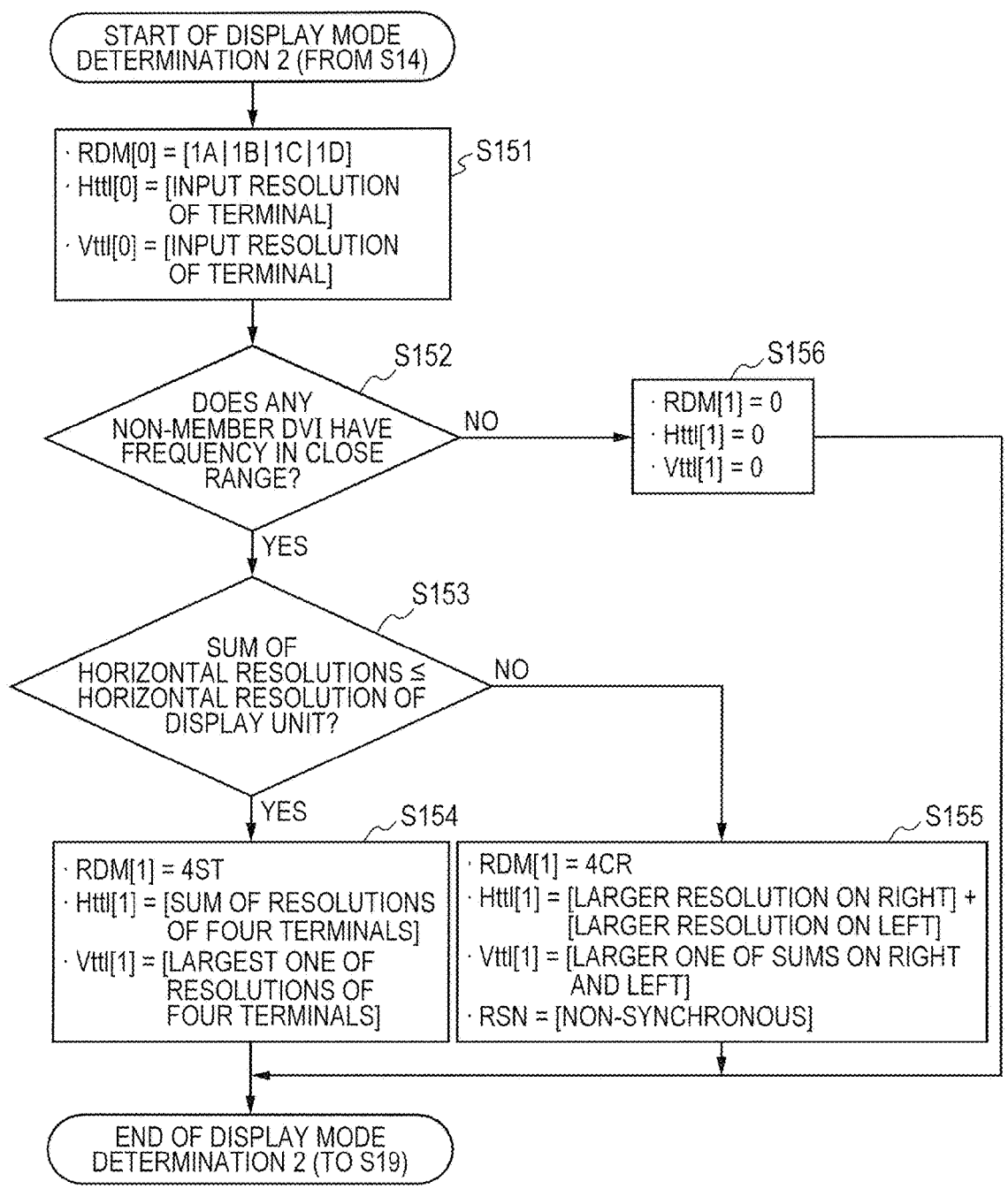
FIG. 6 illustrates display mode determination process 2 followed by the recommended display mode determination unit 170.

FIG. 6 is a diagram illustrating display mode determination process 2 in detail. If three input terminals belong to a search group, the recommended display mode determination unit 170 determines at step S151 that the most recommended display mode of the three input terminals belonging to the search group is the single input mode. The recommended display mode determination unit 170 stores any one of display mode identifiers 1A, 1B, 1C, and 1D in RDM[0] corresponding to an input terminal belonging to the search group. The recommended display mode determination unit 170 stores input resolutions of the input terminal belonging to the search group in Httl[0] and Vttl[0].

At step S152, the recommended display mode determination unit 170 determines whether the frequency of a DVI terminal not belonging to the search group is within a predetermined range from the frequency of the search group. The recommended display mode determination unit 170 executes step S153 if the determination at step S152 gives YES, or executes step S156 if the determination gives NO. At step S156, the recommended display mode determination unit 170 determines that there is no next most recommended display mode, and stores 0 in RDM[1], Httl[1], and Vttl[1].

At step S153, similarly to step S131, the recommended display mode determination unit 170 determines whether the sum of the horizontal resolutions of four member terminals of four input terminals including the DVI terminal not belonging to the search group is smaller than the horizontal resolution of the display unit 110. The recommended display mode determination unit 170 executes S154 if the determination at step S153 gives YES, or executes S155 if the determination gives NO.

At steps 5154 and 5155, the recommended display mode determination unit 170 performs the same calculation as that at steps 5132 and 5133, on the four input terminals including the DVI terminal not belonging to the search group, and stores a result of the calculation in RDM[1], Httl[1], and Vttl[1]. If the next most recommended display mode is allocated to the search group, the reason of downgrade to the next most recommended display mode at steps S154 and S155 is because the frequencies of image signals inputted to the four input terminals are in a non-synchronous state, and thus the recommended display mode determination unit 170 stores, in RSN, information indicating the non-synchronous state.

Figure 7:
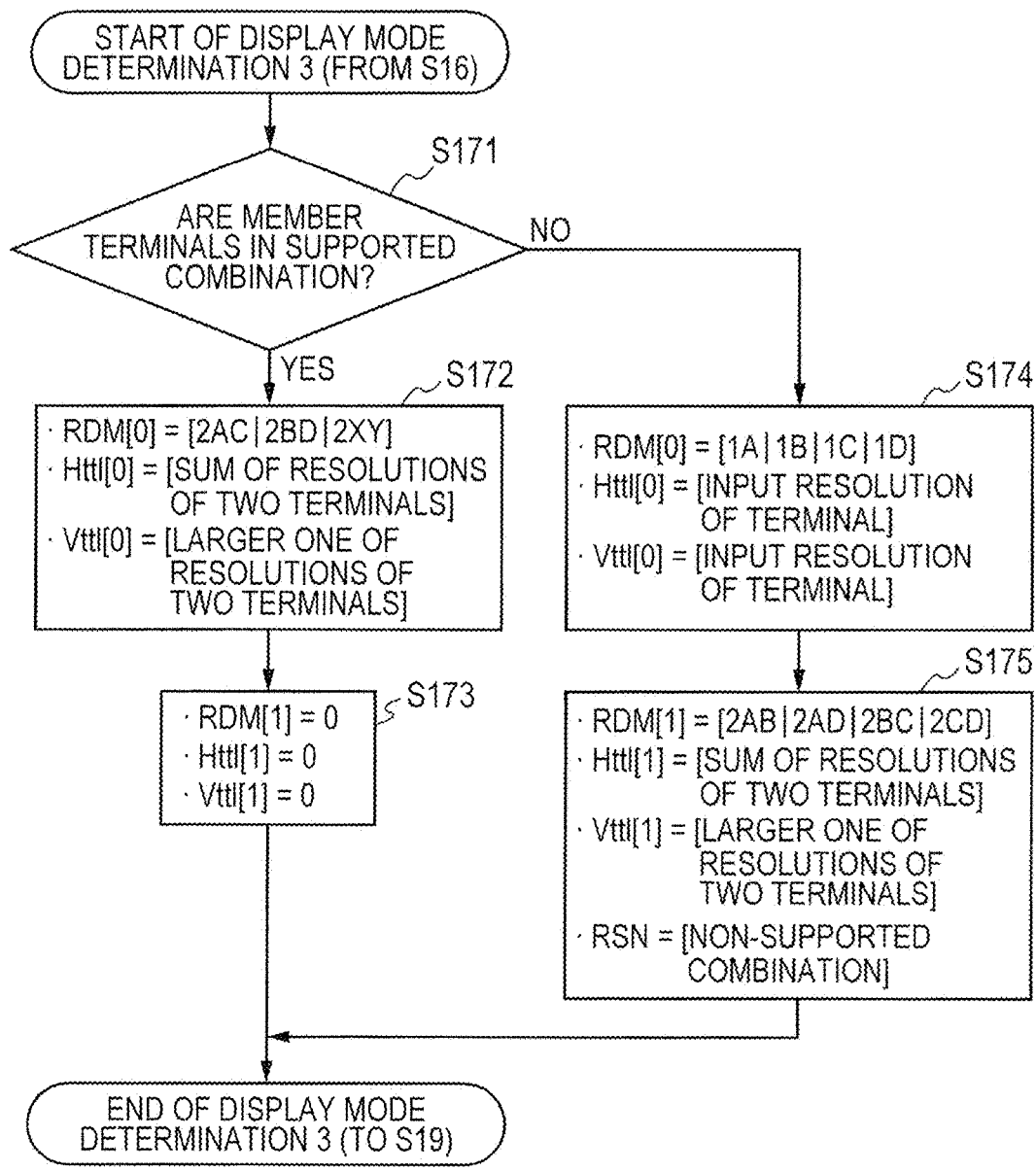
FIG. 7 illustrates display mode determination process 3 followed by the recommended display mode determination unit 170.

FIG. 7 is a diagram illustrating display mode determination process 3 in detail. If two input terminals belong to the search group, the recommended display mode determination unit 170 determines at step S171 whether a combination of the two input terminals belonging to the search group is supported by the image connection unit 140. The recommended display mode determination unit 170 executes step S172 if the determination at step S171 gives YES, or executes step S174 if the determination gives NO.

At step S172, the recommended display mode determination unit 170 determines that the most recommended display mode is the horizontal two-division input mode, and stores, in RDM[0], any one of display mode identifiers 2AC, 2BD, and 2XY in accordance with the combination of the two input terminals belonging to the search group. The recommended display mode determination unit 170 stores, in Httl[0], the sum of the horizontal resolutions of the two input terminals belonging to the search group, and stores, in Vttl[0], the larger one of the vertical resolutions of the two input terminals belonging to the search group.

At step S173, the recommended display mode determination unit 170 determines that there is no next most recommended display mode, and stores 0 in RDM[1], Httl[1], and Vttl[1].

At step S174, the recommended display mode determination unit 170 determines that the most recommended display mode of the two input terminals belonging to the search group is the single input mode, and stores any of display mode identifiers 1A, 1B, 1C, and 1D in RDM[0] for the corresponding input terminal. The recommended display mode determination unit 170 stores, in Httl[0] and Vttl[0], the horizontal resolution and vertical resolution, respectively, of image data inputted to the corresponding input terminal.

At step S175, the recommended display mode determination unit 170 determines that the next most recommended display mode of the two input terminals belonging to the search group is the horizontal two-division input mode, performs calculation same as that at step S172, and stores a result of the calculation in RDM[1], Httl[1], and Vttl[1]. In this case, the reason of downgrade to the next most recommended display mode is because the combination of the terminals is not supported. Thus, the recommended display mode determination unit 170 stores information indicating the non-supported combination in RSN.

Figure 8:
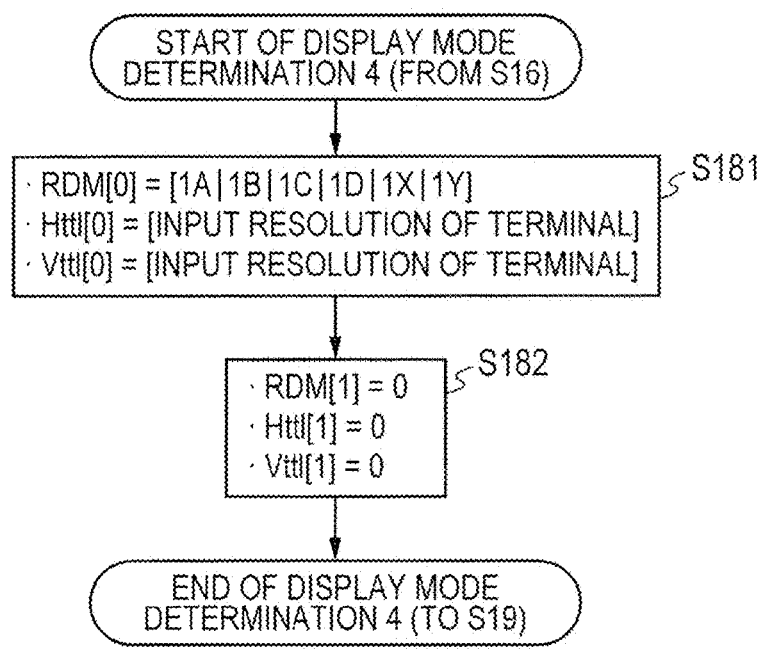
FIG. 8 illustrates display mode determination process 4 followed by the recommended display mode determination unit 170.

FIG. 8 is a diagram illustrating display mode determination process 4 in detail. If only one input terminal belongs to the search group and the most recommended display mode is the single input mode, the recommended display mode determination unit 170 stores any one of display mode identifiers 1A, 1B, 1C, 1D, 1X, and 1Y in RDM[0] corresponding to the input terminal at step S181. The recommended display mode determination unit 170 stores input resolutions of the input terminal in Httl[0] and Vttl[0] corresponding to the input terminal. At step S182, the recommended display mode determination unit 170 determines that there is no next most recommended display mode, and stores 0 in RDM[1], Httl[1], and Vttl[1].

After the recommended display mode determination unit 170 executes the above-described processing, all parameters in the terminal property memory 160 are appropriately updated. In the above description, the recommended display mode determination unit 170 sets, to be the next most recommended display mode, a state in which only one terminal is out of synchronization in the horizontal four-division input mode and the matrix four-division input mode. However, the recommended display mode determination unit 170 does not set, to be the next most recommended display mode, any non-synchronous state in the horizontal two-division input mode. This is because, when three input terminals are synchronized with each other in the four-division input mode, it is likely that the remaining terminal is wrongly set, but it is unlikely that any remaining terminal is wrongly set in the two-division input mode.

EXAMPLES

Operations of the terminal property memory 160 and a display group selection menu when an image signal is input will be described below with reference to four examples.

Example 1

FIG. 9 is a diagram illustrating a terminal property table stored in the terminal property memory 160 when the recommended display mode determination unit 170 executes the most recommended display mode determination process illustrated in FIGS. 4 to 8 under a condition in Example 1. FIG. 10 is a diagram illustrating the display mode selection menu after the most recommended display mode determination process illustrated in FIGS. 4 to 8 is executed.

In Example 1, image signals are inputted to the four input terminals DVI-A 121, DVI-B 122, DVI-C 123, and DVI-D 124. Each image signal has a resolution of 1920×1080 and a frequency of 60.0001 Hz. In addition, image signals each having a resolution of 1920×2160 and a frequency of 59.9400 Hz are inputted to the two input terminals HDMI-X 125 and HDMI-Y 126.

The image signals inputted to the four input terminals DVI-A 121, DVI-B 122, DVI-C 123, and DVI-D 124 have an equal frequency, and thus the group determination unit 150 determines that these four input terminals belong to one group, and allocates group 1 as the belonged group identifier. The image signals inputted to the two input terminals HDMI-X 125 and HDMI-Y 126 have an equal frequency, and thus the group determination unit 150 determines that these two input terminals belong to one group, and allocates group 2 as the belonged group identifier.

In FIG. 10, connected image icons in two rows of horizontal two-division input mode HDMI-XY 501 and matrix four-division input mode DVI-ABCD 502 as the most recommended display modes have white backgrounds. An icon in each row of the single input mode is gray, indicating that the single input mode is not the most recommended display mode but an image signal is inputted. Information related to the image signal is displayed on the right side of the gray icon. When the user presses the NEXT button while a menu illustrated in FIG. 10 is being displayed, the selection cursor moves between horizontal two-division input mode HDMI-XY 501 and matrix four-division input mode DVI-ABCD 502 as the most recommended display modes in turn to allow selection at each press on the NEXT button.

Example 2

Figure 12:
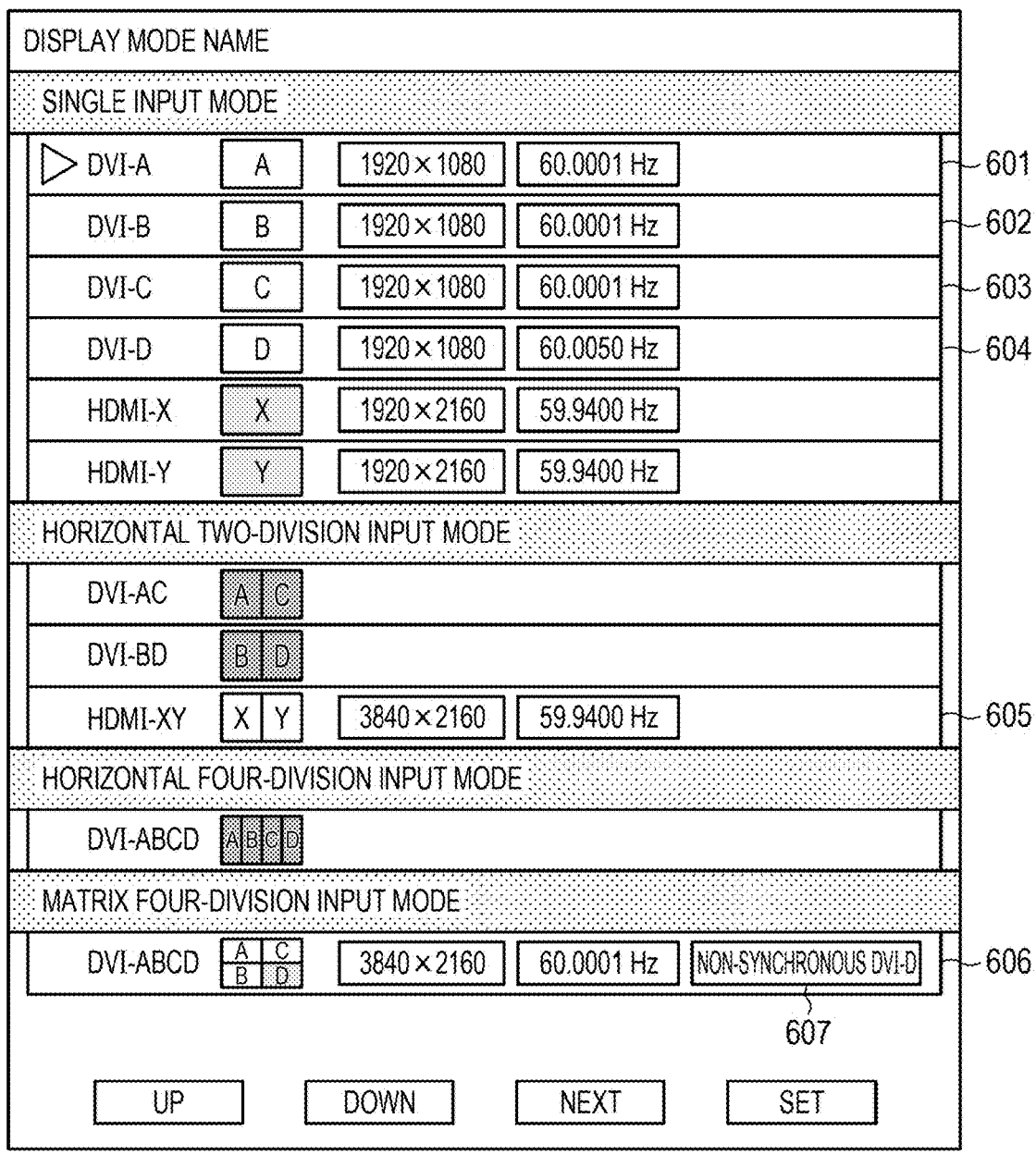
FIG. 12 is a diagram illustrating a display mode selection menu in Example 2.

FIG. 11 is a diagram illustrating a terminal property table stored in the terminal property memory 160 when the recommended display mode determination unit 170 executes the most recommended display mode determination process illustrated in FIGS. 4 to 8 under a condition in Example 2. FIG. 12 is a diagram illustrating the display mode selection menu after the most recommended display mode determination process illustrated in FIGS. 4 to 8 is executed.

Image signals inputted in Example 2 are the same as image signals in Example 1 except that the frequency of an image signal of the terminal DVI-D 124 is 60.0050 Hz. The three input terminals DVI-A 121, DVI-B 122, and DVI-C 123 have an equal frequency, and thus the group determination unit 150 determines that these three input terminals belong to one group, and allocates group 1 as the belonged group identifier. The terminal DVI-D 124 has a slightly different frequency and thus is determined to belong to a group different from group 1, and group 2 is allocated as the belonged group identifier. The two input terminals HDMI-X 125 and HDMI-Y 126 have an equal frequency, and thus are determined to belong to one group, and group 3 is allocated as the belonged group identifier.

In FIG. 12, connected image icons in five rows of single input modes DVI-A 601, DVI-B 602, DVI-C 603, and DVI-D 604 and horizontal two-division input mode HDMI-XY 605 as the most recommended display modes have white backgrounds. In the connected image icon of matrix four-division input mode DVI-ABCD 606 as the next most recommended display mode, parts indicating the terminals DVI-A 121, DVI-B 122, and DVI-C 123 being synchronized with each other have white backgrounds, and the terminal DVI-D 124 being not synchronized has a gray background.

In addition, in FIG. 12, information column 607 indicates that the terminal DVI-D not synchronized. An icon in a row of each of single input modes HDMI-X and HDMI-Y is gray, indicating that the single input mode is not the most recommended display mode but an image signal is inputted, and information related to the image signal is displayed. When the user presses the NEXT button while the menu illustrated in FIG. 12 is being displayed, the selection cursor moves between five display modes of the single input modes DVI-A 601, DVI-B 602, DVI-C 603, and DVI-D 604, and the horizontal two-division input mode HDMI-XY 605 as the most recommended display modes in turn to allow selection.

Example 3

FIG. 13 is a diagram illustrating a terminal property table stored in the terminal property memory 160 when the recommended display mode determination unit 170 executes the most recommended display mode determination process illustrated in FIGS. 4 to 8 under a condition in Example 3. FIG. 14 is a diagram illustrating the display mode selection menu after the most recommended display mode determination process illustrated in FIGS. 4 to 8 is executed.

In Example 3, image signals each having a resolution of 1920×1200 and a frequency of 59.9502 Hz are inputted to the two input terminals DVI-A 121 and DVI-B 122, and image signals each having a resolution of 1280×1600 and a frequency of 59.9719 Hz are inputted to the two input terminals DVI-C 123 and DVI-D 124. In addition, image signals each having a resolution of 1920×2160 and a frequency of 59.9400 Hz are inputted to the two input terminals HDMI-X 125 and HDMI-Y 126.

The image signals inputted to the two input terminals DVI-A 121 and DVI-B 122 have an equal frequency, and thus the group determination unit 150 determines that these two input terminals belong to one group, and allocates group 1 as the belonged group identifier. The two input terminals DVI-C 123 and DVI-D 124 have an equal frequency, and thus the group determination unit 150 determines that these two input terminals belong to one group, and allocates group 2 as the belonged group identifier. The image signals inputted to the two input terminals HDMI-X 125 and HDMI-Y 126 have an equal frequency, and thus the group determination unit 150 determines that these two input terminals belong to one group, and allocates group 3 as the belonged group identifier.

In FIG. 14, connected image icons in five rows of single input modes DVI-A 701, DVI-B 702, DVI-C 703, and DVI-D 704, and horizontal two-division input mode HDMI-XY 709 as the most recommended display modes have white backgrounds. An icon in a row of each of single input mode HDMI-X 705 and HDMI-Y 706 is gray, indicating that the single input mode is not the most recommended display mode but an image signal is inputted.

Horizontal two-division input modes DVI-AC 707 and DVI-BD 708 are each the next most recommended display mode, and an information column indicates, as information for correctly connection, that the downgrade reason is a non-supported combination. Connected image icons are black to allow the user to recognize that there is a problem. When the NEXT button 315 is pressed while the selection cursor 312 is touching the horizontal two-division input mode, the selection cursor 312 moves to an input mode of the most recommended display mode. Specifically, the selection cursor moves between five rows of single input modes DVI-A 701, DVI-B 702, DVI-C 703, and DVI-D 704, and horizontal two-division input mode HDMI-XY 709 in turn.

Example 4

Figure 16:
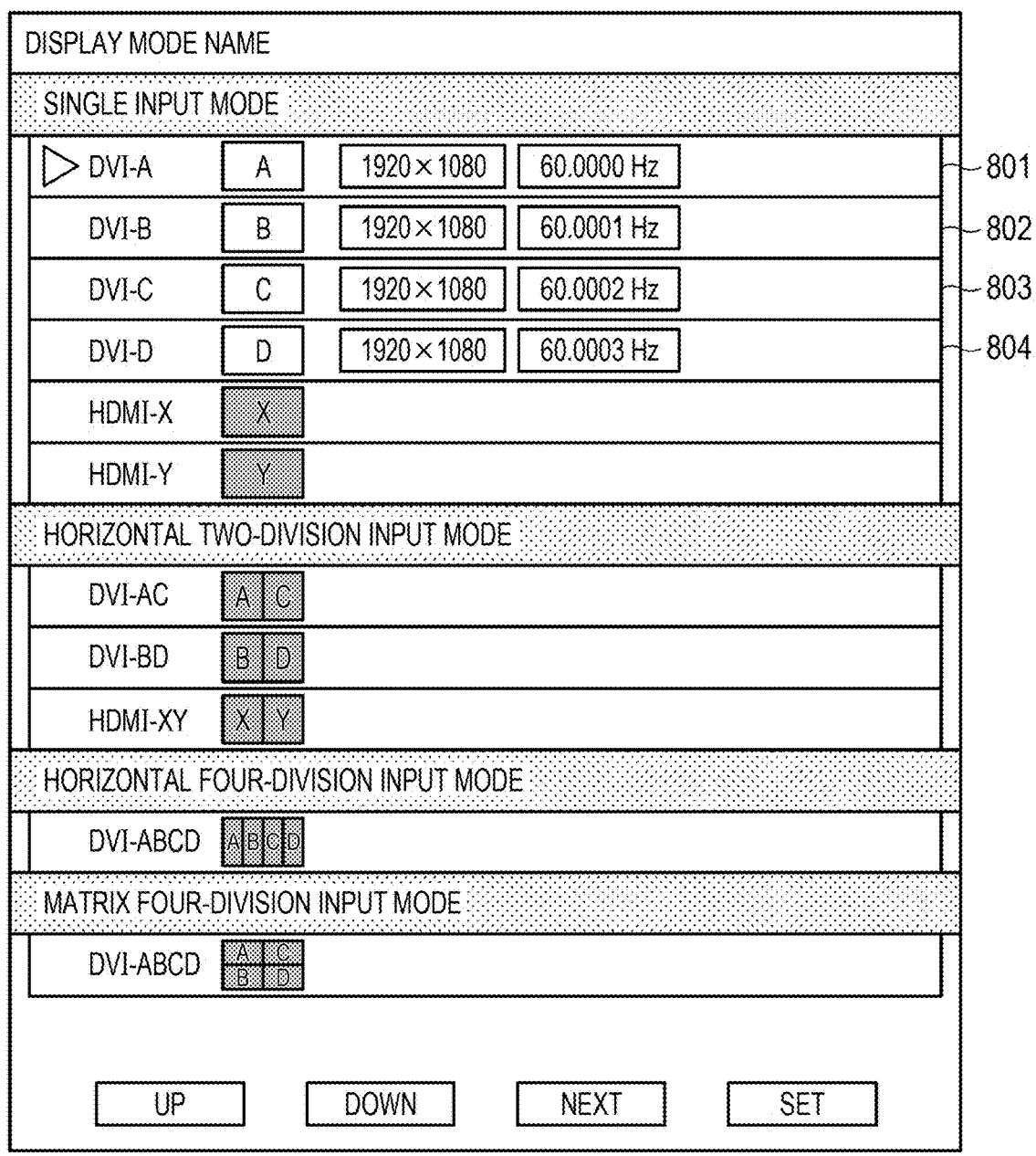
FIG. 16 is a diagram illustrating a display mode selection menu in Example 4.

FIG. 15 is a diagram illustrating a terminal property table stored in the terminal property memory 160 when the recommended display mode determination unit 170 executes the most recommended display mode determination process illustrated in FIGS. 4 to 8 under a condition in Example 4. FIG. 16 is a diagram illustrating the display mode selection menu after the most recommended display mode determination process illustrated in FIGS. 4 to 8 is executed.

In Example 4, image signals each having a resolution of 1920×1080 and having frequencies of 60.0000, 60.0001, 60.0002, and 60.0003 Hz are inputted to the three input terminals DVI-A 121, DVI-B 122, and DVI-C 123. No image signals are inputted to the terminals HDMI-X 125 and HDMI-Y 126. The image signals inputted to the four input terminals DVI-A 121, DVI-B 122, DVI-C 123, and DVI-D 124 have frequencies different from each other, and thus the group determination unit 150 determines that these four input terminals belong to different groups, and allocates groups 1 to 4 as the belonged group identifiers.

In FIG. 16, connected image icons in four rows of single input modes DVI-A 801, DVI-B 802, DVI-C 803, and DVI-D 804 as the most recommended display modes have white backgrounds. When the user presses the NEXT button while this menu is being displayed, the selection cursor moves between the four rows of single input modes DVI-A 801, DVI-B 802, DVI-C 803, and DVI-D 804 as the most recommended display modes in turn.

[Effect of Display Device 1 According to First Embodiment]

As described above, the display device 1 detects characteristics of a plurality of image signals inputted to a plurality of input terminals, and classifies the image signals into at least one group based on the detected characteristics at the group determination unit 150. Then, the display device 1 displays, on the display unit 110, a display mode selection menu screen indicating a display mode associated with at least one group. This configuration allows a user to easily understand what kind of display is possible when the image signals are inputted to the display device 1.

When an input image signal is suitable for display, the display mode selection menu screen displays that a group to which the image signal belongs supports the most recommended display mode. Thus, the user can achieve easy display of the image signals suitable for display by selecting, as a group to be displayed, a group indicated to support the most recommended display mode.

[Second Embodiment]

In the display device 1 according to the first embodiment, a layout of image data based on a plurality of image signals inputted from a plurality of input terminals is determined in advance at display on a screen. A display device 2 according to a second embodiment is different from the display device 1 according to the first embodiment from in that a layout of a plurality of pieces of image data is determined based on image data included in image signals.

Figure 17:
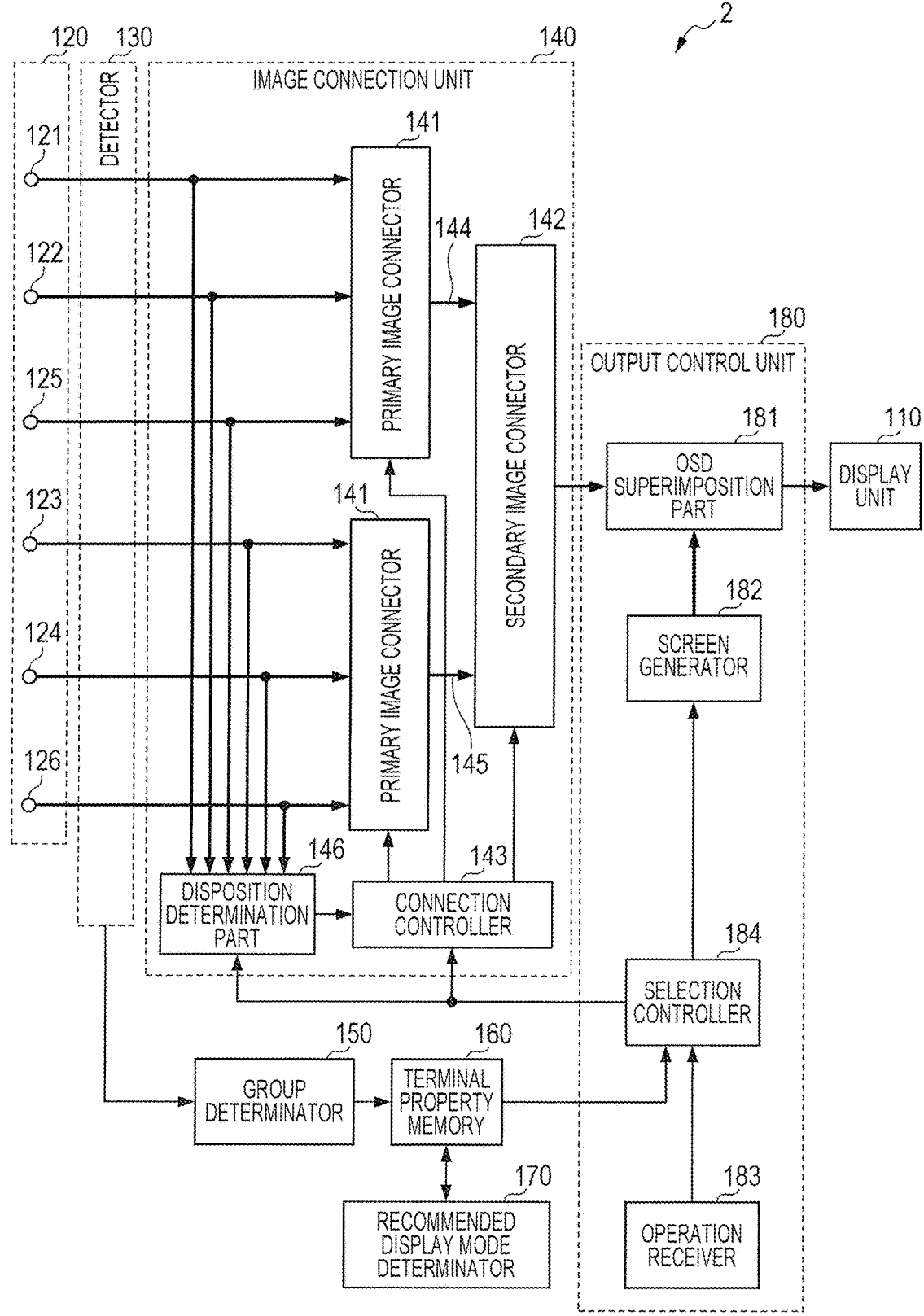
FIG. 17 is a configuration diagram of a display device 2 according to a second embodiment.

FIG. 17 is a diagram illustrating the configuration of the display device 2 according to the second embodiment. The image connection unit 140 according to the present embodiment further includes a layout determination unit (a layout determinator) 146, which is a difference from the image connection unit 140 according to the first embodiment.

The layout determination unit 146 determines a layout of a plurality of pieces of image data to be displayed based on information for specifying a display mode selected by a user through the selection controller 184, and a plurality of image signals inputted from the video input unit 120, and notifies the connection controller 143 of a result of the determination. Under control of the connection controller 143, the secondary image connector 142 outputs, to the output control unit 180, synthesis image data in which the pieces of image data are connected in the layout based on the result of the determination by the layout determination unit 146. The output control unit 180 superimposes screen data of, for example, an operation menu on the synthesis image data and outputs the superimposed screen data to the display unit 110, similarly to the first embodiment.

The output control unit 180 generates a screen in which a plurality of pieces of image data are arranged at positions determined at the layout determination unit 146 based on a correlation between pieces of pixel data within a predetermined range from the periphery of each piece of image data based on a plurality of image signals included in a group selected by the user, and outputs the screen to the display unit 110. The layout determination unit 146 compares, for example, the pixel values between each pair of the pixels nearest to the peripheries of the pieces of image data, and arranges the pieces of image data at positions at which the number of pixel pairs each having the same pixel value is largest.

Specifically, the layout determination unit 146 determines a layout of a plurality of pieces of image data through a procedure described below. First, the layout determination unit 146 selects one piece of first image data from among a plurality of pieces of image data included in a selected group. Subsequently, the layout determination unit 146 selects one side of the selected first image data, and specifies first pixel values of a plurality of pixels nearest to the periphery of the selected side. Subsequently, the layout determination unit 146 specifies second pixel values of a plurality of pixels nearest to the periphery of one side of another piece of image data likely to come next to the selected side, and compares the first pixel values of the first image data and the second pixel values of the other piece of image data.

The layout determination unit 146 determines that, among the other pieces of image data, the piece of image data having a largest number of pixels in which the second pixel values match with the first pixel values is the piece of image data likely to come next to the selected side. The layout determination unit 146 performs the same processing on all sides of the first image data to specify a piece of image data likely to come next to each side. In this manner, the layout determination unit 146 can determine a layout of a plurality of pieces of image data.

Figure 18A:
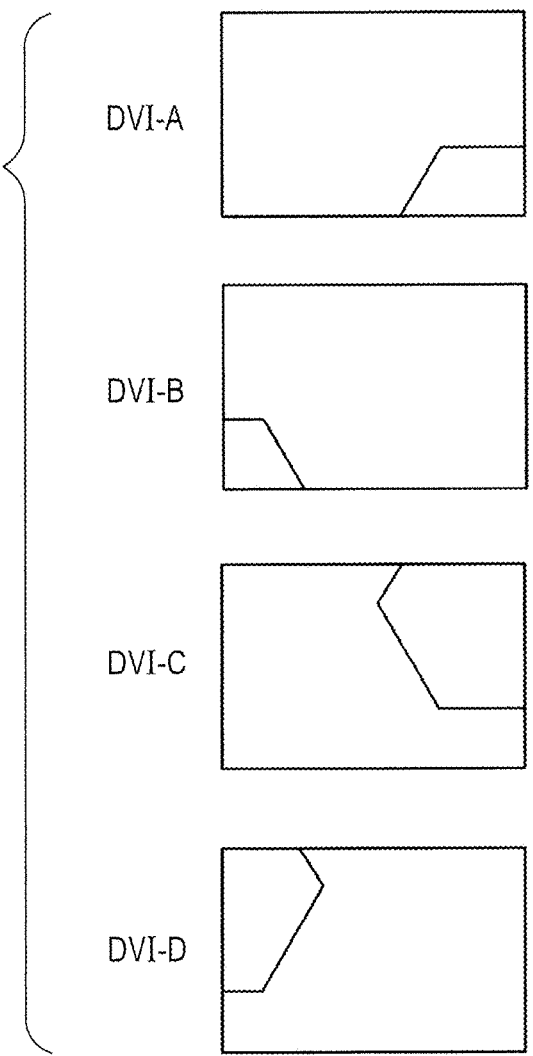
FIGS. 18A and 18B are each a diagram illustrating exemplary processing of determining four pieces of image data based on pixel continuity.
Figure 18B:
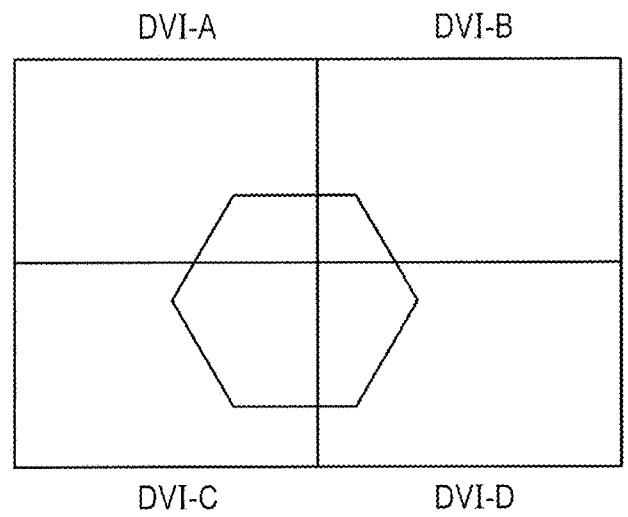

FIGS. 18A and 18B are each a diagram illustrating exemplary processing of determining a layout of four pieces of image data based on pixel continuity, executed by the layout determination unit 146. FIG. 18A illustrates the four pieces of image data in a separated manner. The layout determination unit 146 can arrange the four pieces of image data as illustrated in FIG. 18B based on a probability that pixel values near the peripheries of sides of the four pieces of image data match with each other.

When the image data is a moving image, the layout determination unit 146 may generate a screen in which a plurality of pieces of image data based on a plurality of image signals included in a group selected by the user are arranged at positions determined based on motion of any object included in the pieces of image data, and output the generated screen to the display unit 110. In this case, the layout determination unit 146 specifies, for example, the moving direction of the object included in screen data, and determines a layout of the screen data based on the specified moving direction.

Specifically, the layout determination unit 146 determines a layout of the pieces of image data through a procedure described below. First, the layout determination unit 146 selects one piece of first image data from among the pieces of image data included in the selected group. Subsequently, the layout determination unit 146 detects an edge region by extracting a component higher than a predetermined frequency from the selected first image data, and specifies any object included in the first image data. Subsequently, the layout determination unit 146 specifies the moving direction of the specified object based on the positions of the specified object in a plurality of pieces of the first image data acquired at a plurality of times.

Subsequently, the layout determination unit 146 searches for an object identical to the specified object in a plurality of pieces of image data after a timing at which the specified object moves out of the region of the first image data. The layout determination unit 146 arranges image data in which the object identical to the object specified in the first image data is specified, at a position determined based on the moving direction of the object. Specifically, the layout determination unit 146 arranges image data in which the identical object is specified, at a position including a line extending in a direction in which the object moves in the first image data.

Figure 19A:
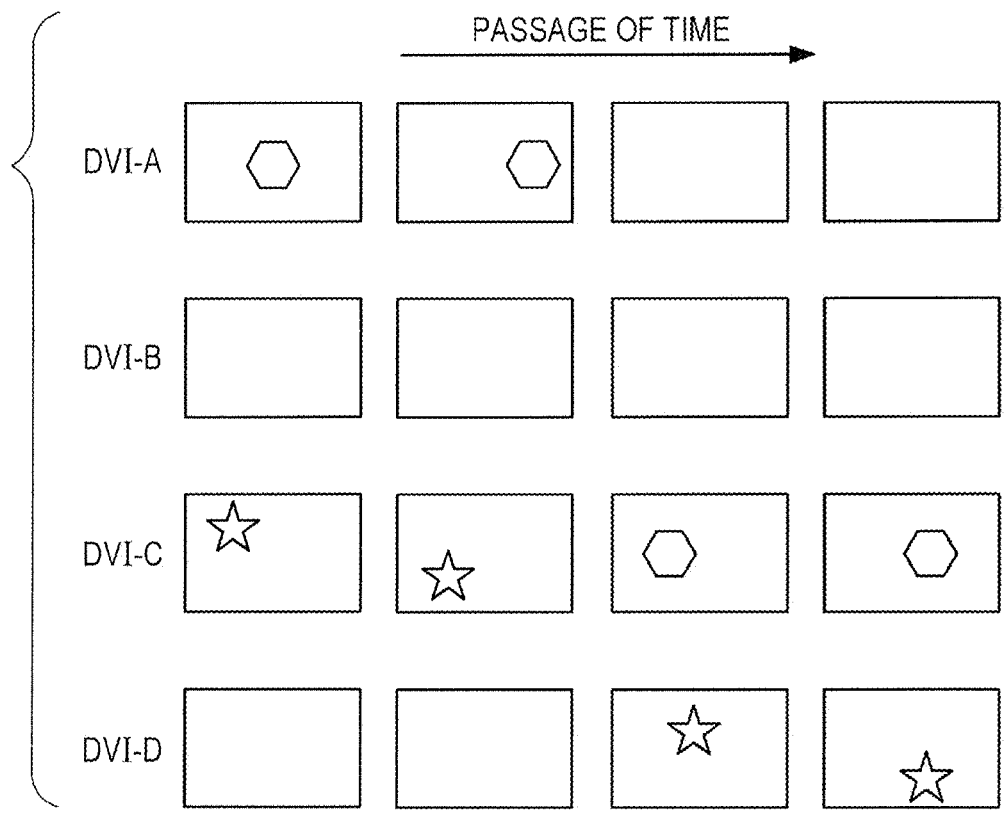
FIGS. 19A and 19B are each a diagram illustrating exemplary processing of determining disposition of four pieces of image data based on motion of an object.
Figure 19B:
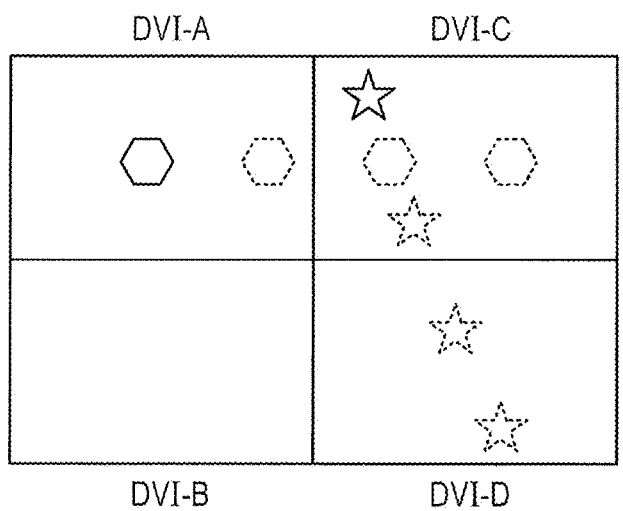

FIGS. 19A and 19B is a diagram illustrating exemplary processing of determining a layout of four pieces of image data based on motion of an object, executed by the layout determination unit 146. In FIG. 19A, as time elapses, a hexagon moves to right in DVI-A image data, disappears from the DVI-A image data, and moves to right in DVI-C image data. In addition, a star moves to lower-right in the DVI-C image data, disappears from the DVI-C image data, and moves to lower-right in DVI-D image data. In this case, the layout determination unit 146 can determine a layout of the four pieces of image data as illustrated in FIG. 19B.

[Effect of Display Device 2 According to Second Embodiment]

As described above, in the display device 2 according to the second embodiment, the layout determination unit 146 determines a layout of a plurality of pieces of image data based on continuity of pixel values included in the image data or motion of an object included in the image data. In this manner, the display device 2 can display, in an appropriate layout, a plurality of pieces of image data based on a plurality of image signals included in one screen while the user does not need to determine to which input terminals the image signals are to be inputted.

[Modification 1]

The above description does not consider a mode in which pieces of image data based on a plurality of image signals input from a plurality of signal sources are simultaneously displayed. However, the display devices 1 and 2 may each include a mode in which pieces of image data based on a plurality of image signals input from a plurality of signal sources are simultaneously displayed. The display devices 1 and 2 each support, for example, a DVI4 input mode in which four image signals inputted from four input terminals are displayed on one screen. In the DVI4 input mode, the display unit 110 is divided into four regions in matrix to display image data based on an image signal inputted from the terminal DVI-A 121 at the center of the upper-left region, image data based on an image signal inputted from the terminal DVI-B 122 at the center of the lower-left region, image data based on an image signal inputted from the terminal DVI-C 123 at the center of the upper-right region, and image data based on an image signal inputted from the terminal DVI-D 124 at the center of the lower-right region.

If the detector 130 determines that the terminals DVI-A 121 to DVI-D 124 are all in different groups, the recommended display mode determination unit 170 determines that the DVI4 input mode is the most recommended display mode. In other words, if the image signals are in a combination illustrated in FIG. 15, the recommended display mode determination unit 170 determines that the DVI4 input mode is the most recommended display mode.

The display devices 1 and 2 may each display, in a plurality of regions, pieces of image data based on a plurality of image signals inputted from DVI terminals and a plurality of image signals inputted from HDMI terminals.

[Modification 2]

In the above description, the display devices 1 and 2 are exemplary electronic devices, but an electronic device according to the present invention is not limited to the display devices 1 and 2. The electronic device according to the present invention includes, for example, a computer or a controller having a configuration other than that of the display unit 110 in the display devices 1 and 2 illustrated in FIG. 1. Such a computer or controller is connected with a display by a cable through which an image signal can be transmitted, and image data included in the image signal is outputted from the output control unit 180 to the display. The computer or controller outputs the display mode selection menu screen to a display configured to output image data, or an own display device such as a display or a light-emitting element.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™ a flash memory device, a memory card, and the like.

The above description is made on the embodiments of the present invention and other embodiments. The embodiments of the present invention include any new embodiment as an optional combination of these embodiments. The new embodiment as a combination achieves effects of embodiments in the combination. The technical scope of the present invention is not limited to the above-described embodiments, and various kinds of modifications and changes are possible without departing from the scope.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-104786, filed May 26, 2016, which is hereby incorporated by reference herein in its entirety.

What is claimed is:

1. An electronic device comprising:
    an image inputter including a plurality of input terminals each of which is configured to be able to receive each of a plurality of image signals, each of the plurality of image signals including an image data to be displayed by a display unit;
    a detector configured to detect each characteristic of the plurality of image signals, each of the plurality of image signals being received in parallel by the respective input terminals;
    a classification unit configured to classify the plurality of image signals into at least one group based on each characteristic detected by the detector;
    a determinator configured to determine a type of the display mode to be associated with each of the at least one group based on the number of image signals included in each group; and
    an outputter configured to output information indicating a display mode of the display unit associated with the at least one group,
    wherein the determinator determines the type of the display mode to be a most recommended display mode when the number of image signals included in the group is equal to a predetermined number, and determines the type of the display mode to be a next most recommended display mode when the number of image signals included in the group is smaller than the predetermined number.

2. The electronic device according to claim 1, wherein the classification unit classifies, into one group, image signals in which the detector detects the same characteristic.

3. The electronic device according to claim 2, wherein the classification unit classifies, into one group, image signals in which the detector detects vertical synchronization signals having an identical frequency.

4. The electronic device according to claim 2, wherein the classification unit classifies, into one group, image signals in which the detector detects vertical synchronization signals having an identical frequency and an identical resolution.

5. The electronic device according to claim 1, wherein the determinator is configured to determine a type of the display mode based on types of the input terminals to which the image signals included in each of the at least one group are inputted.

6. The electronic device according to claim 1, further comprising a storage unit configured to store, in association with the input terminals, the characteristics of the image signals inputted to the input terminals, identification information of the group to which the input terminals belong, and a type of the display mode associated with the group.

7. The electronic device according to claim 1, wherein the outputter outputs, in a different manner depending on a type of the display mode, screen data for receiving an operation to select one group from the at least one group.

8. The electronic device according to claim 7, wherein the outputter outputs the screen data including an operation image for selecting the at least one group, the type of the display mode of which satisfies a predetermined condition.

9. The electronic device according to claim 7, wherein the outputter outputs the screen data including warning information when the number of image signals included in the group is smaller than a predetermined number.

10. The electronic device according to claim 1, wherein the outputter outputs the image signals included in a group selected from the at least one group in the display mode associated with the selected group.

11. The electronic device according to claim 10, wherein the outputter outputs image data based on the image signals included in the selected group in a layout determined based on the number of the image signals and the resolutions of the image signals.

12. The electronic device according to claim 10, wherein the outputter outputs a plurality of pieces of image data based on the image signals included in the selected group in a layout determined based on a correlation between pieces of pixel data within a predetermined range from peripheries of the pieces of image data.

13. The electronic device according to claim 10, wherein the outputter outputs a plurality of pieces of image data based on the image signals included in the selected group in a layout determined based on motion of an object included in the pieces of image data.

14. A display device comprising:
a display unit configured to display an image;
an image inputter including a plurality of input terminals each of which is configured to be able to receive each of a plurality of image signals, each of the plurality of image signals including an image data to be displayed by the display unit;
a detector configured to detect each characteristic of the plurality of image signals, each of the plurality of image signals being received in parallel by the respective input terminals;
a classification unit configured to classify the plurality of image signals into at least one group based on each characteristic detected by the detector;
a determinator configured to determine a type of the display mode to be associated with each of the at least one group based on the number of image signals included in each group; and
an outputter configured to output, to the display unit, information indicating a display mode of the display unit associated with the at least one group,
wherein the determinator determines the type of the display mode to be a most recommended display mode when the number of image signals included in the group is equal to a predetermined number, and determines the type of the display mode to be a next most recommended display mode when the number of image signals included in the group is smaller than the predetermined number.

15. A display control method comprising the steps of:
receiving in parallel each of a plurality of image signals by each of a plurality of respective input terminals, each of the plurality of image signals including an image data to be displayed by a display unit;
detecting each characteristic of the plurality of image signals;
classifying the plurality of image signals into at least one group based on each of the detected characteristics;
determining a type of the display mode to be associated with each of the at least one group based on the number of image signals included in each group; and
outputting, to the display unit, information indicating a display mode of the display unit associated with the at least one group,
wherein the type of the display mode is determined to be a most recommended display mode when the number of image signals included in the group is equal to a predetermined number, and the type of the display mode is determined to be a next most recommended display mode when the number of image signals included in the group is smaller than the predetermined number.

16. The electronic device according to claim 1, wherein the display mode is a user-selectable display mode.

17. The electronic device according to claim 2, wherein the classification unit classifies, into one group, image signals in which the detector detects horizontal synchronization signals having an identical frequency.

* * * * *